(12) United States Patent
Kashioka et al.

(10) Patent No.: US 6,947,596 B2
(45) Date of Patent: Sep. 20, 2005

(54) CHARACTER RECOGNITION METHOD, PROGRAM AND RECORDING MEDIUM

(75) Inventors: Junji Kashioka, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 09/925,319

(22) Filed: Aug. 10, 2001

(65) Prior Publication Data

US 2002/0051574 A1 May 2, 2002

(30) Foreign Application Priority Data

Nov. 1, 2000 (JP) ........................................ 2000-334296
May 10, 2001 (JP) ........................................ 2001-140140

(51) Int. Cl.[7] ................................................ G06K 9/00
(52) U.S. Cl. ........................ 382/186; 382/176; 382/179
(58) Field of Search ................................ 382/119, 175, 382/176, 186, 187, 188, 189, 179

(56) References Cited

U.S. PATENT DOCUMENTS

| | | | | |
|---|---|---|---|---|
| 5,018,216 A | * | 5/1991 | Kojima | 382/170 |
| 5,577,135 A | * | 11/1996 | Grajski et al. | 382/253 |
| 5,579,408 A | * | 11/1996 | Sakaguchi et al. | 382/187 |
| 5,610,996 A | * | 3/1997 | Eller | 382/187 |
| 6,539,113 B1 | * | 3/2003 | Van Kleeck | 382/185 |
| 2003/0113019 A1 | * | 6/2003 | Nakagawa | 382/187 |

* cited by examiner

Primary Examiner—Jon Chang
(74) Attorney, Agent, or Firm—Staas & Halsey LLP

(57) ABSTRACT

The present invention provides a character recognition method and recording medium for recognizing characters entered in a document or the like including preprint information. An object of the invention is to recognize characters in contact with or superposed on the preprint information without using any knowledge of the preprint information or a difference in gray level. An image in an area where the characters to be recognized are present is divided into line segments individually, wherein the image is obtained by reading the preprint information and the entry characters. A recognition image is created by changing a combination of the plurality of line segments divided. A recognition result with the reliability is memorized by making the character recognition for the created recognition image. And the recognition result having a greatest reliability is output by executing the character recognition for all the combinations while changing the combination of line segments successively.

16 Claims, 26 Drawing Sheets

AREA DIVIDED INTO LINE SEGMENTS

FIG. 7
(a) 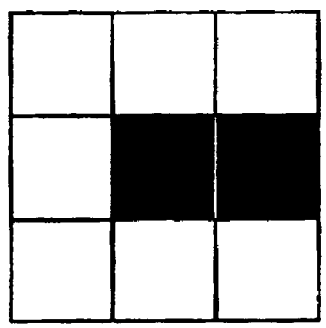  (b) 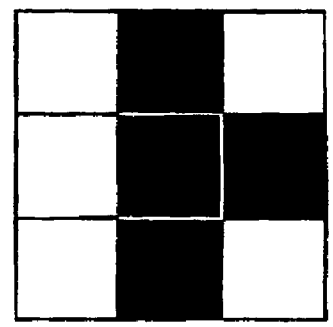

FIG. 15
 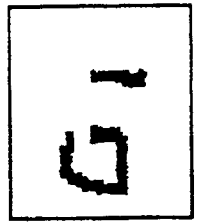 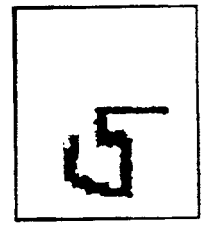
(a) ORIGINAL IMAGE          (b) COMBINATION WITHOUT CONNECTIVITY          (c) COMBINATION WITH CONNECTIVITY

FIG. 16
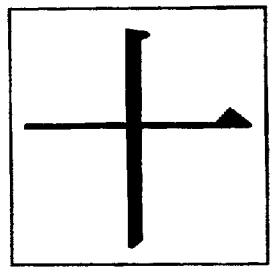
(a) IMAGE "+" IN MING-STYLE TYPE
```
         a91
         a9
         a9
         a9      2
11111111a9111111121
         a9
         a9
         a9
         a9
         a
```
(b) RUN DISTRIBUTION OF IMAGE "+" IN MING-STYLE TYPE IN VERTICAL DIRECTION
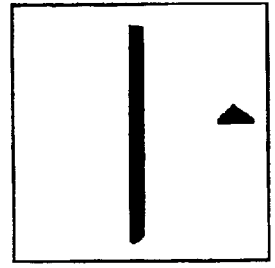
(a) IMAGE "+" IN MING-STYLE TYPE FROM WHICH PORTION WITH RUN WIDTH 1 IN VERTICAL DIRECTION IS DELETED

FIG. 17
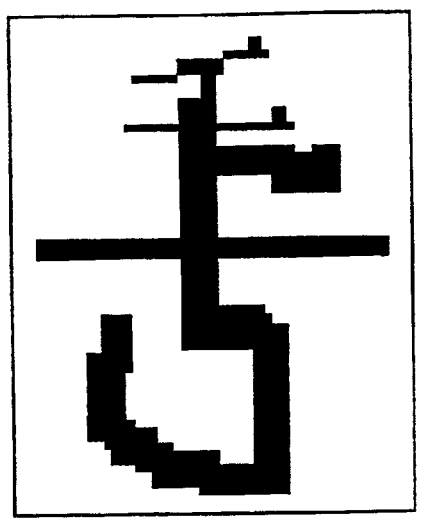
(a) ORIGNAL IMAGE
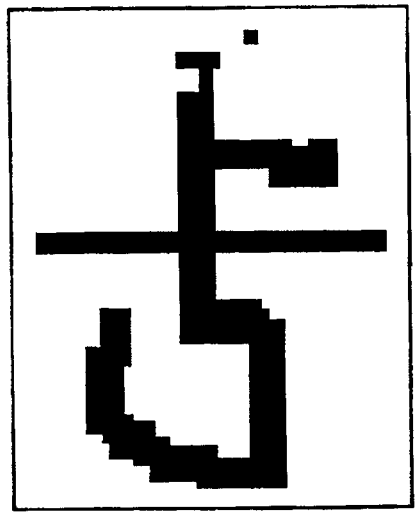
(b) IMAGE AFTER ITS PORTION WITH FINE LINE WIDTH IS REMOVED
FIG. 18
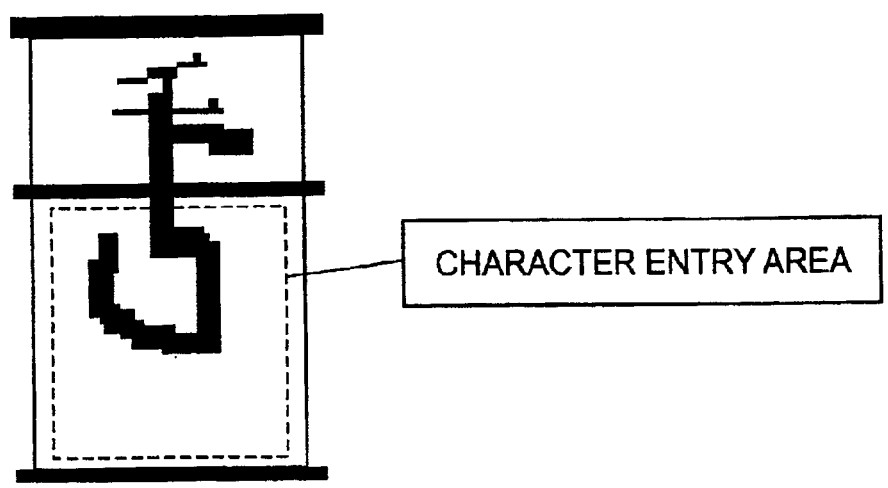
CHARACTER ENTRY AREA

| EXCHANGED OBJECT CHARACTER | EXCHANGING OBJECT CHARACTER |
|---|---|
| 0 | 6, 8 |
| 1 | 4, 7, 9 |
| 6 | 0 |
| 8 | 0 |

| EXCHANGED OBJECT CHARACTER | EXCHANGING OBJECT CHARACTER | RELIABILITY WHEN EXCHANGING |
|---|---|---|
| 0 | 6 | 200 |
| | 8 | 220 |
| 1 | 4 | 230 |
| | 7 | 200 |
| | 9 | 240 |
| 6 | 0 | 220 |
| 8 | 0 | 250 |

FIG. 29
INSTANCE OF FALSE RECOGNITION
 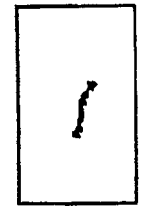
INPUT IMAGE
(ENTRY CHARACTER "7")
IMAGE EMPLOYED AS
RECOGNITION RESULT
(RECOGNITION RESULT "1")
(a)
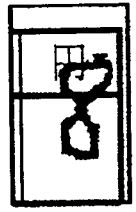 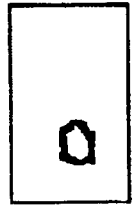
INPUT IMAGE
(ENTRY CHARACTER "8")
IMAGE EMPLOYED AS
RECOGNITION RESULT
(RECOGNITION RESULT "0")
(b)
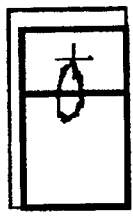 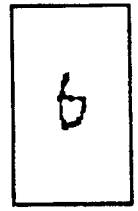
INPUT IMAGE
(ENTRY CHARACTER "0")
IMAGE EMPLOYED AS
RECOGNITION RESULT
(RECOGNITION RESULT "6")
(c)

CHARACTER RECOGNITION METHOD, PROGRAM AND RECORDING MEDIUM

BACKGROUND OF THE INVENTION

1. Field of the Invention

The present invention relates to a character recognition method, program and recording medium.

In recent years, a character recognition technology has been broadly utilized to input characters handwritten or printed on a paper into the computer. In order to indicate entry locations of characters on the paper such as a document, some guide characters or ruled lines (hereinafter referred to as preprint information) are drawn on a paper face to allow the characters to be entered near the guide characters or ruled lines in most cases.

In such cases, it happens that recognizing correctly the entry characters becomes difficult, because of the presence of the preprint information. So the improvements are needed.

2. Description of the Prior Art

FIG. 28 shows an example of characters written over the preprint information. In this example, the characters representing the units of ten million, million, hundred thousand, ten thousand, thousand, hundred, ten and yen for the amount of money, and the ruled lines representing the frames for writing the characters (numbers) corresponding to the units are preprinted, whereby the user can enter the handwritten characters (numbers) on the paper, as shown in the drawing.

The conventional method for recognizing the characters written on the paper including the preprint information will be described below. Using the known information concerning the preprint information, the preprint information is deleted from the read information containing the preprint information to leave behind the entry character information, which is then only recognized. In this case, employing the known information such as the positional information in the area where the preprint characters or ruled lines are present, and the kind of preprint character, the preprint characters or ruled lines can be deleted. In an environment where the document can be read as a gray level image, there is a character recognition method in which if there is a difference in gray level between the preprint information and the characters for recognition, only the characters for recognition are extracted using the difference in gray level to effect the character recognition.

Of the conventional methods as above described, the method of deleting the preprint information had the problem that if there is no knowledge concerning the preprint information, the character recognition can not be performed correctly. Also, even though the preprint information can be extracted by another method, an extraction error may occur in some cases, or when the ruled line or the preprint information remains with the characters for recognition, the character recognition result may be false.

Further, in the case where the document could not be acquired as a gray level image owing to the limitations on the system, or there was no or less difference in gray level between the preprint information and the characters for recognition, there was the problem that the characters for recognition could not be extracted from the gray level information.

SUMMARY OF THE PRESENT INVENTION

It is a first object of the present invention to solve these problems, and provide a character recognition method, program and recording medium, in which the characters in contact with or superposed on the preprint information can be recognized without using the knowledge of the preprint information or the difference in gray level.

A new character recognition method that can accomplish the first object has been proposed based on the present invention, but this character recognition method may cause a false recognition, as shown in FIG. 29.

FIG. 29 shows some instances of false recognition. According to the character recognition method to accomplish the first object for the characters written over the preprint information as shown in FIG. 28, an input image shown to the left in (a), (b) or (c) of FIG. 29 is recognized as an image shown to the right and adopted as the recognition result. More particularly, in a case where "7" having a line segment in the longitudinal direction is written over the preprint character, as shown in (a) of FIG. 29, the recognition result may be false like recognizing "1" for "7" due to a longitudinal line component of "7". Also, in a case where "8" is written over the preprint character, as shown in (b) of FIG. 29, one of two loops for forming "8" may be recognized wrongly as "0". Like this, for the original character to be recognized, a character may be falsely recognized as another character close to a partial pattern of that character. Also, in a case where "0" is written over the preprint character, as shown in (c) of FIG. 29, "0" may be falsely recognized as "6" (or "8") due to a line intersecting "0".

It is a second object of the invention to provide a correct recognition result by preventing false recognition which may occur with the method for accomplishing the first object.

A first fundamental invention of the present invention to realize the first object is a character recognition method for recognizing characters entered in a document or the like including preprint information. The method comprises the following steps. Dividing an image in an area where the characters to be recognized are present into line segments individually, the image being obtained by reading said preprint information and the entry characters, creating a recognition image by changing a combination of a plurality of line segments divided, memorizing a recognition result with reliability by making the character recognition for said created recognition image and outputting the recognition result having a greatest reliability by making the character recognition for all the combinations while changing said combination of line segments successively.

Another invention concerning to the first fundamental invention to realize the first object is a character recognition program. The program comprises the following steps.

Dividing an image in an area where characters to be recognized are present into line segments individually, wherein the image is obtained by reading the characters entered in a document or the like including preprint information, creating a recognition image by changing a combination of a plurality of line segments divided, memorizing a recognition result with a reliability by making character recognition for said created recognition image and outputting the recognition result having a greatest reliability by making the character recognition for all the combinations while changing said combination of line segments successively.

Another invention concerning to the first fundamental invention is a computer readable recording medium storing a character recognition program. The program comprises the following functions.

Dividing an image in an area where characters to be recognized are present into line segments individually, wherein the image is obtained by reading the characters entered in the document or the like including preprint information, creating a recognition image by changing a combination of said plurality of line segments divided, memorizing a recognition result with reliability by making the character recognition for said created recognition image; and outputting the recognition result having a greatest reliability by making the character recognition for all the combinations while changing said combination of line segments successively.

A second fundamental invention of the present invention to realize the second object is a character recognition method further comprising the following functions in addition to the first fundamental invention.

The function is that, when said character recognition result is a character registered as having a high possibility of false recognition for other character pattern, said character recognition result is exchanged by said other character, if there is any recognition candidate obtained for said other character in a process of making the character recognition while changing said combination of line segments.

Another invention concerning to the second fundamental invention is a character recognition program. The program comprises the following functions.

Dividing an image in an area where characters to be recognized are present into line segments individually, wherein the image is obtained by reading the characters entered in the document or the like including preprint information, creating a recognition image by changing a combination of said plurality of line segments divided, memorizing a recognition result with reliability by making the character recognition for said created recognition image and outputting the recognition result having a greatest reliability by making the character recognition for all the combinations while changing said combination of line segments successively, wherein when said output character recognition result is a character registered as having a high possibility of false recognition for other character pattern, said character recognition result is exchanged by said other character, if there is a recognition candidate obtained for said other character in a process of making the character recognition.

Another invention concerning to the second fundamental invention is a computer readable recording medium storing a program. The program comprises the following functions.

Dividing an image in an area where characters to be recognized are present into line segments individually, wherein the image is obtained by reading the characters entered in the document or the like including preprint information, creating a recognition image by changing a combination of said plurality of line segments divided, memorizing a recognition result with reliability by making the character recognition for said created recognition image and outputting the recognition result having a greatest reliability by making the character recognition for all the combinations while changing said combination of line segments successively, wherein when said output character recognition result is a character registered as having a high possibility of false recognition for other character pattern, said character recognition result is exchanged by said other character, if there is a recognition candidate obtained for said other character in a process of making the character recognition.

The objects, advantages and features of the present invention will be more clearly understood by referencing the following detailed disclosure and the accompanying drawings.

BRIEF DESCRIPTION OF THE DRAWINGS

FIG. 7 is a view showing an example of pixels at an endpoint and a point of intersection;

FIG. 15 is a view showing an example of reducing a number of recognitions owing to a connectivity of a line segment image;

FIG. 16 is an explanatory view of deleting a portion of image with small line width;

FIG. 17 is a view showing a specific example for removing the preprint information with small line width;

FIG. 18 is a view showing an example in which a character entry area is known in advance;

FIG. 29 is a view showing several instances of false recognition.

DETAILED DESCRIPTION OF THE PREFERRED EMBODIMENT

Figure 1:
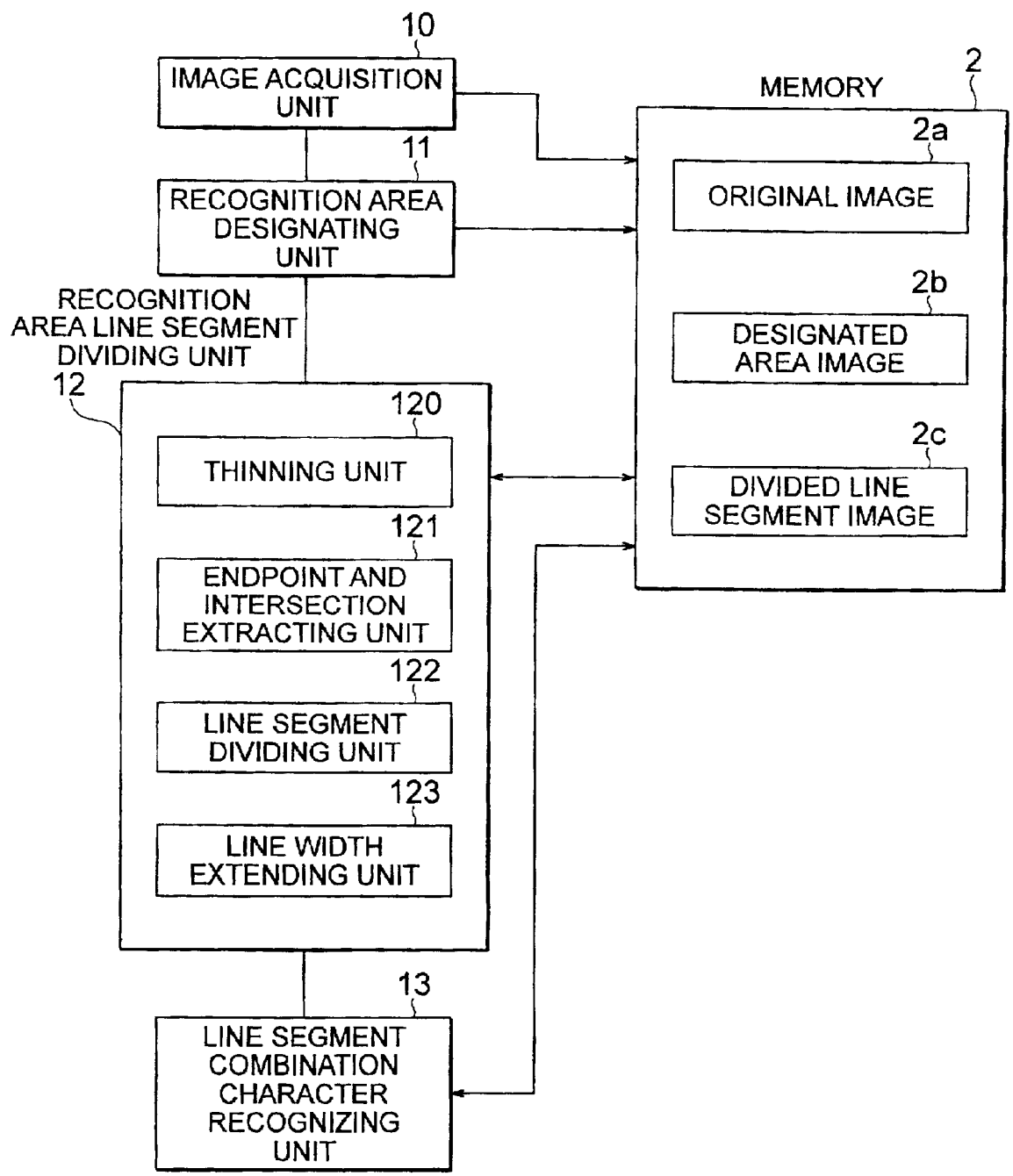
FIG. 1 is a block diagram showing a first principle configuration of the present invention.

FIG. 1 is a first principle configuration of the present invention. In the drawing, reference numeral 10 denotes an image acquisition unit, 11 denotes a recognition area designating unit, 12 denotes a recognition area line segment dividing unit, 120 denotes thinning unit, 121 denotes endpoint and intersection extracting unit, 122 denotes line segment dividing unit, 123 denotes line width extending unit, 13 denotes a line segment combination character recognizing unit, 2 denotes a memory, 2a denotes an original image, 2b denotes a designated area image, and 2c denotes a divided line segment image.

First of all, the image acquisition unit 10 scans an area where the characters are written on the paper including the preprint information (and the ruled lines), and an original image 2a is stored in the memory 2. Then, the recognition area designating unit 11 designates one character entry area from the areas on the paper. This can be designated by designating the area beforehand, or referring to the result of layout analysis. By the designation, the character entry area including the specific characters for recognition are cut out along with the preprint information in contact with or superposed by the characters, whereby a designated area image 2b is obtained in the memory 2. Then, the recognition area line segment dividing unit 12 divides the line segment by unit 120 to 123. That is, each line segment within the designated area is thinned into line segment making up the image by the thinning unit 120, the endpoint or intersection is extracted by the endpoint and intersection extracting unit 121, and further employing the endpoint and the extracted intersection, the continuous fine line is divided (or decomposed) into individual line segments from endpoint to endpoint, endpoint to intersection, and intersection to intersection by the line segment dividing unit 122. Further, the line width extending unit 123 extends the line width of each line segment divided to as thick as that of the original image 2a, and its result is stored as a divided line segment image 2c in the memory 2. Then, the line segment combination character recognizing unit 13 performs the character recognition for a combination of line segments of the divided line segment image 2c. At this time, various methods as (1) to (6) are provided for the combination of divided (or decomposed) line segments or the processing of line segments.

(1) A method for recognizing the characters entered in contact with or superposed on the preprint information, comprising decomposing the components in an area containing the characters into line segments, recognizing characters while changing the combination of line segments decomposed, and adopting the character recognition result with the maximum reliability among the combinations, whereby the characters entered in contact with or superposed on the preprint information such as the rule lines or characters are recognized.

(2) The character recognition is performed only when all the line segments combined are connected in the above (1).

(3) The character recognition is performed after the line segments with narrow line width are removed beforehand in the above (1).

(4) In the case of the above (1) where an entry area for entering the characters for recognition is known, or can be extracted from the result of layout analysis, the character recognition is performed by combining the line segments in such a manner that the line segments contained in the entry area are necessarily included in the combinations of line segments.

(5) In the case of the above (1) where one of both ends of a line segment is the endpoint, and the line segment is short, the character recognition is performed by excluding the line segment from the candidates of line segments to be combined.

(6) The character recognition is performed only if the size of a graphic to be created by the combination of line segments is within a predetermined range in the above (1).

Figure 2:
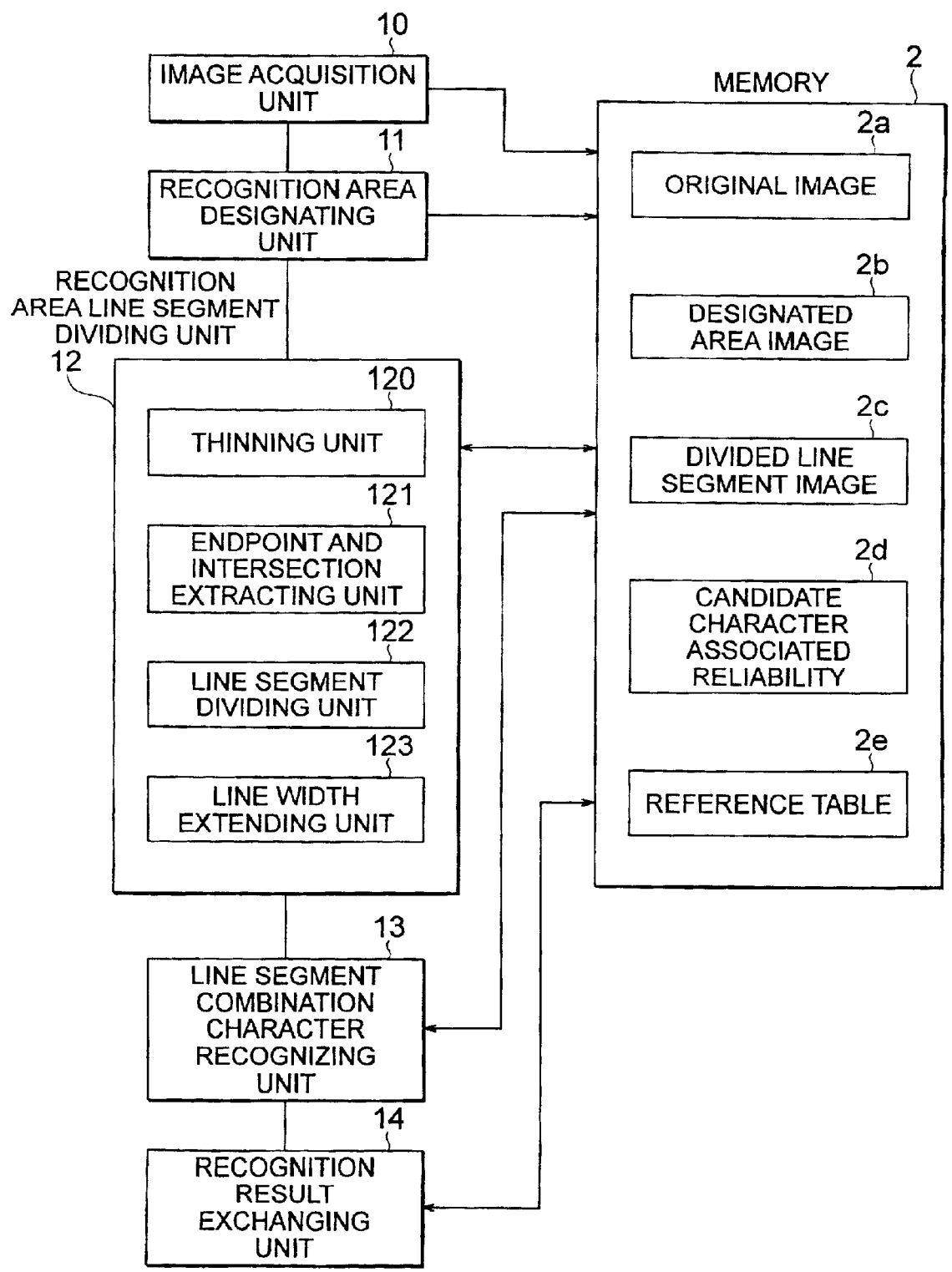
FIG. 2 is a block diagram showing a second principle configuration of the present invention.

FIG. 2 shows a second principle configuration of the present invention to realize the second object. In the drawing, reference numerals 10 to 13, 2, 120 to 123 for the recognition area line segment dividing unit 12, and 2a to 2c for the memory 2 denote the same parts as those of FIG. 1, and are no more described. Reference numeral 14 denotes a recognition result exchanging unit that is a feature of this second principle configuration, and in the memory 2, 2d denotes a candidate character reliability, and 2e denotes a reference table for exchanging the character recognition result.

In the same manner as in FIG. 1, the recognition area designating unit 11 designates an area, the recognition area line segment dividing unit 12 divides the line segment in the area by using the unit 120 to 123, and the line segment combination character recognizing unit 13 collates the character pattern for each recognition candidate to calculate the reliability (similarity), while changing the combination of line segments. In this way, each recognition candidate character and reliability (similarity) 2d are stored in the memory 2, so that the recognition result with the greatest reliability is output.

On the other hand, the reference table 2e for exchanging the character recognition result in the memory 2 contains characters (hereinafter referred to as exchanged object characters) registered in advance as having the high possibility of false recognition that the character recognition result is any other character pattern.

Receiving a recognition result from the line segment combination character recognizing unit 13, the recognition result exchanging unit 14 exchanges the recognition result in accordance with any one of the following (1) to (4).

(1) The recognition result exchanging unit 14 discriminates whether or not the character received as the recognition result corresponds to any exchanged object character of the reference table 2e in the memory 2, and if so, the exchanged object character is exchanged by an exchanging object character when any other recognition candidate (exchanging object character) is obtained by referring to the reference table 2e in the memory. Thereby, the false recognition can be avoided, and the character recognition accuracy is enhanced.

(2) The recognition result exchanging unit 14 exchanges the character recognition result only if the reliability of character recognition for the exchanging object character (other recognition candidate character) is greater than or equal to a predetermined value obtained by referring to the candidate character reliability 2d. Thereby, in the case where the recognition result corresponds to any exchanged object character registered, the recognition result is not exchanged at every time, so that the recognition result can be exchanged with higher reliability.

(3) The recognition result exchanging unit 14 exchanges the character recognition result only if any line segments for constituting the recognition result of the exchanged object character are contained in the line segments making up the recognition candidate for the exchanging object character. Thereby, in the case where the false character recognition result is obtained due to a partial pattern for a certain character, this can be replaced with a correct character, resulting in more reliability.

(4) The recognition result exchanging unit 14 exchanges the character recognition result only if the reliability of the character recognition result for the exchanging object character is greater than or equal to a predetermined value, and any line segments for constituting the recognition result of the exchanged object character are contained in the line segments making up a recognition candidate for the exchanging object character. That is, the accuracy of exchanging the character recognition result can be further improved by combining (2) and (3).

In the first and second principle configurations of the present invention, particularly the functions of the recognition area designating unit 11, the recognition area line segment dividing unit 12, the line segment combination character recognizing unit 13, and the recognition result exchanging unit 14, among the functions as shown in FIGS. 1 and 2, can be implemented by the use of the programs stored in the computer readable recording medium.

Figure 3:
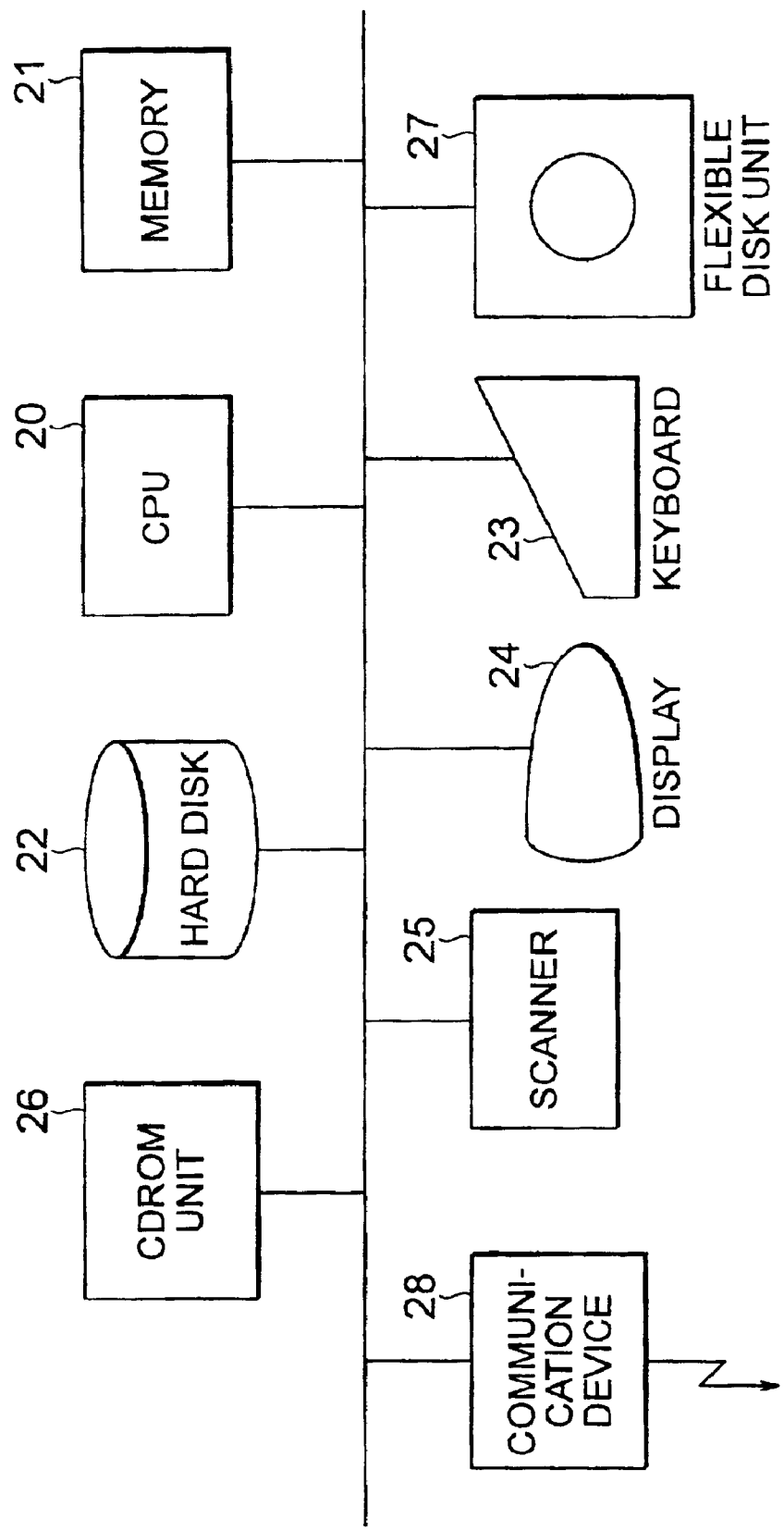
FIG. 3 is a block diagram showing a configuration of an information processing apparatus with which the present invention is practiced.

FIG. 3 shows a configuration of an information processing apparatus (computer) with which the present invention is practiced. In the drawing, reference numeral 20 denotes a CPU, 21 denotes a memory for storing the data or programs, 22 denotes a hard disk, 23 denotes a keyboard, 24 denotes a display, 25 denotes a scanner for scanning the characters or patterns printed or written on the paper, 26 denotes a CDROM unit, 27 denotes a flexible disk unit, and 28 denotes a communication device.

Figure 4:
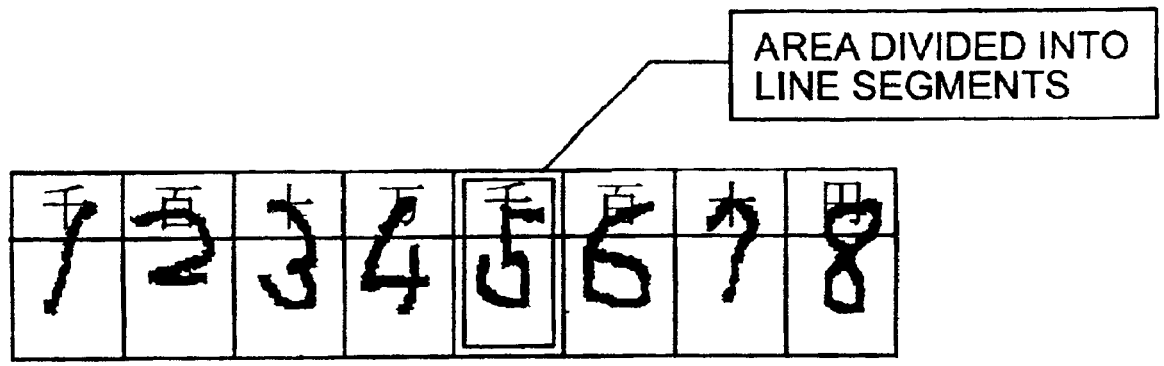
FIG. 4 is a view showing an example of a read result.
Figure 28:
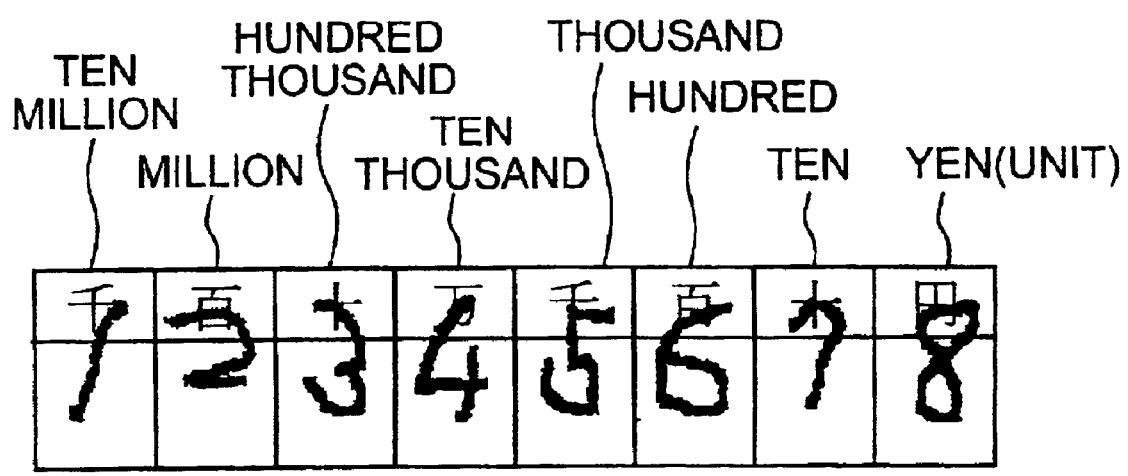
FIG. 28 is a view showing an example of characters written over the preprint information.

First of all, as a function of the image acquisition unit 10 as shown in FIGS. 1 and 2, the scanner 25 scans the characters on the paper such as the document that is subjected to character recognition, and further the scanned result is stored in the memory 21. Thus, an example of scanned result is shown in FIG. 4, but this example is the same as the contents of FIG. 28. Then, as a corresponding function of the recognition area designating unit 11 of FIGS. 1 and 2, an area for possibly entering the characters is prepared as the layout information, or an area for entering the characters is acquired from the result of layout analysis, and further its rectangular coordinates are passed as a region for dividing into line segments to the recognition area line segment dividing unit 12 of FIGS. 1 and 2. In the example of FIG. 4, a fifth region from the left side of the character entry area is designated.

This invention is achieved by using a program on the memory 21 having a processing function as described below. The program is stored in a CDROM or a flexible disk with the CDROM unit 26 or the flexible disk unit 27, or can be downloaded via the communication device 28 from a device like a remote terminal device etc. into the memory.

With a corresponding function of the recognition area line segment dividing unit 12 of FIGS. 1 and 2, a process of dividing the components (including the preprint information) within the area into line segments is performed, on the basis of the rectangular coordinates information. Its details will be described below by reference to FIG. 5.

Figure 5:
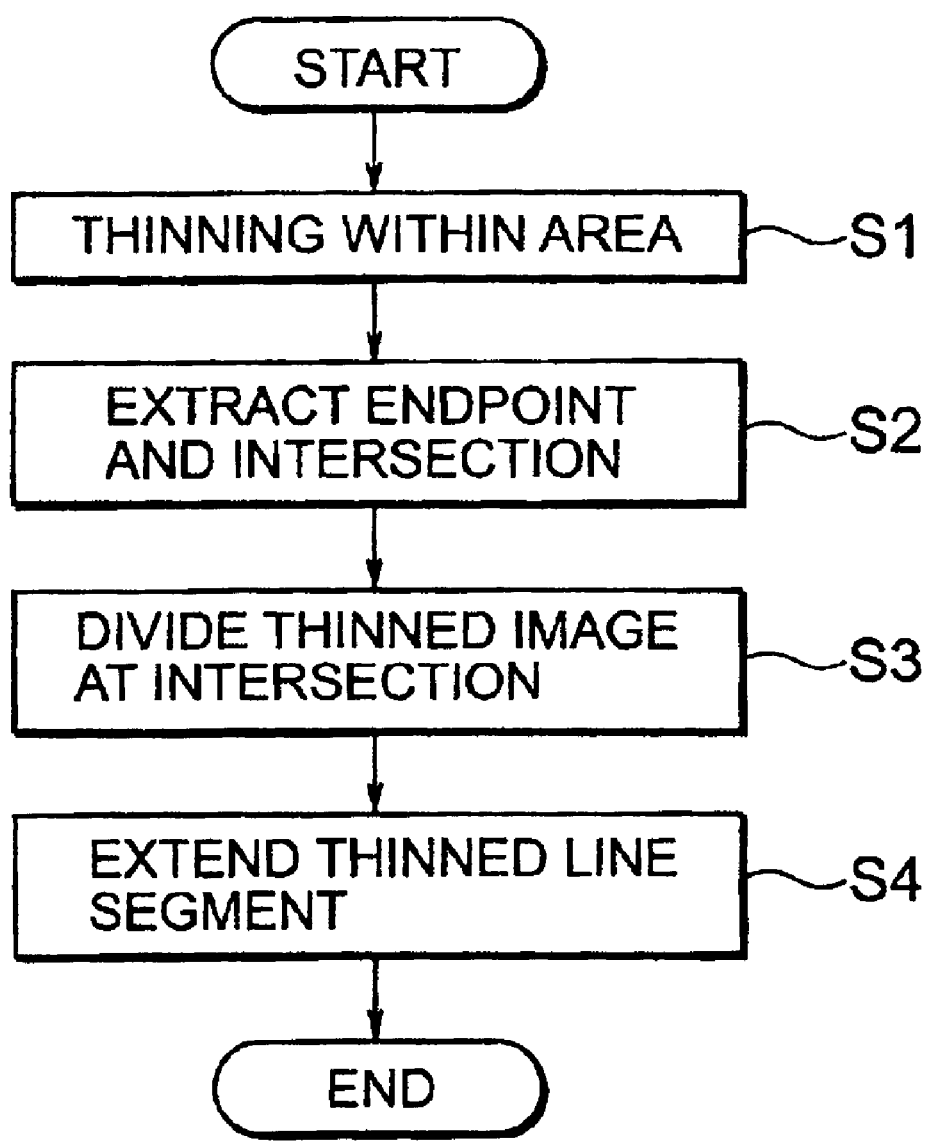
FIG. 5 is a flowchart of dividing into line segments.
Figure 6:
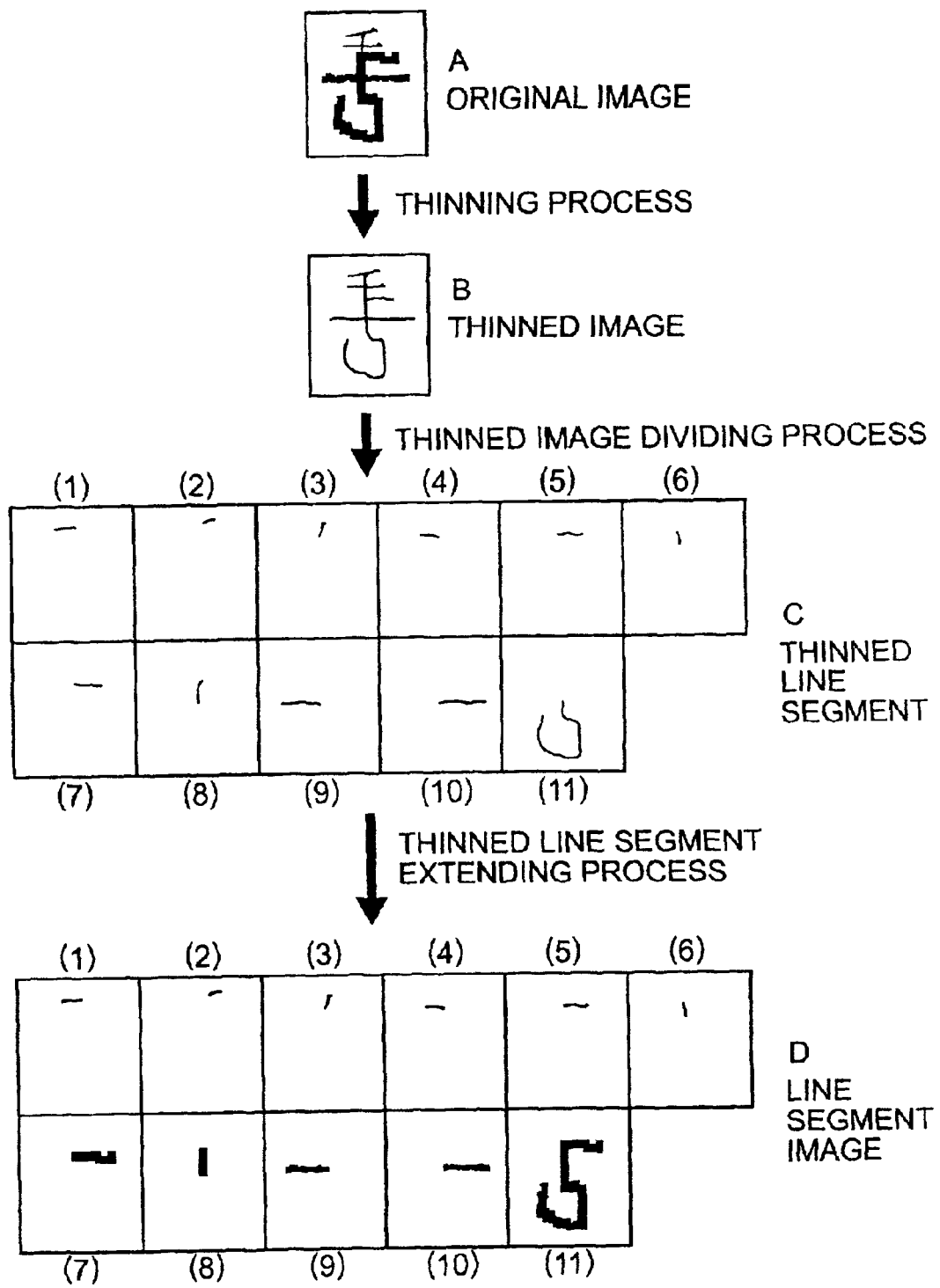
FIG. 6 is a view showing a specific example of creating a line segment image.

FIG. 5 is a flowchart of line segment division. This line segment division will be described below in connection with the example of the designated region as shown in FIG. 4 by referring to the specific example of line segment image creation as shown in FIG. 6 and the example of endpoint and intersection pixels as shown in FIG. 7. A processing flow showing the details of endpoint and intersection division in the line segment dividing unit is shown in FIG. 8 and will be also described together with this explanation.

First of all, the line segments within the area are thinned (S1 in FIG. 5). In the example of FIG. 6, an original image within the area is indicated by A., in which a handwritten character "5" is entered with the character 千 "thousand" and rule indicating an entry frame which are preprinted on the document. By thinning the image within this area, a thinned image is obtained as indicated by B in FIG. 6. Then, the endpoint and the intersection are extracted from this thinned image (S2 in FIG. 5), and the thinned image is divided at the endpoint and the intersection (S3 in FIG. 5). An example of pixels at the endpoint and the intersection is shown in FIG. 7. FIG. 7A is an example of the endpoint, in which when a noticing pixel being a black pixel, there is only one black pixel in eight pixels around the noticing pixel. FIG. 7B is an example of the intersection, in which when a noticing pixel being a black pixel, there are three or more black pixels in eight pixels around the noticing pixel.

Then, the thinned image is divided at the intersection at step S3 in the flow of FIG. 5. In the corresponding example of FIG. 6, the thinned image is divided into eleven fine line segments (1) to (11), as indicated by C. through this division processing.

Figure 8:
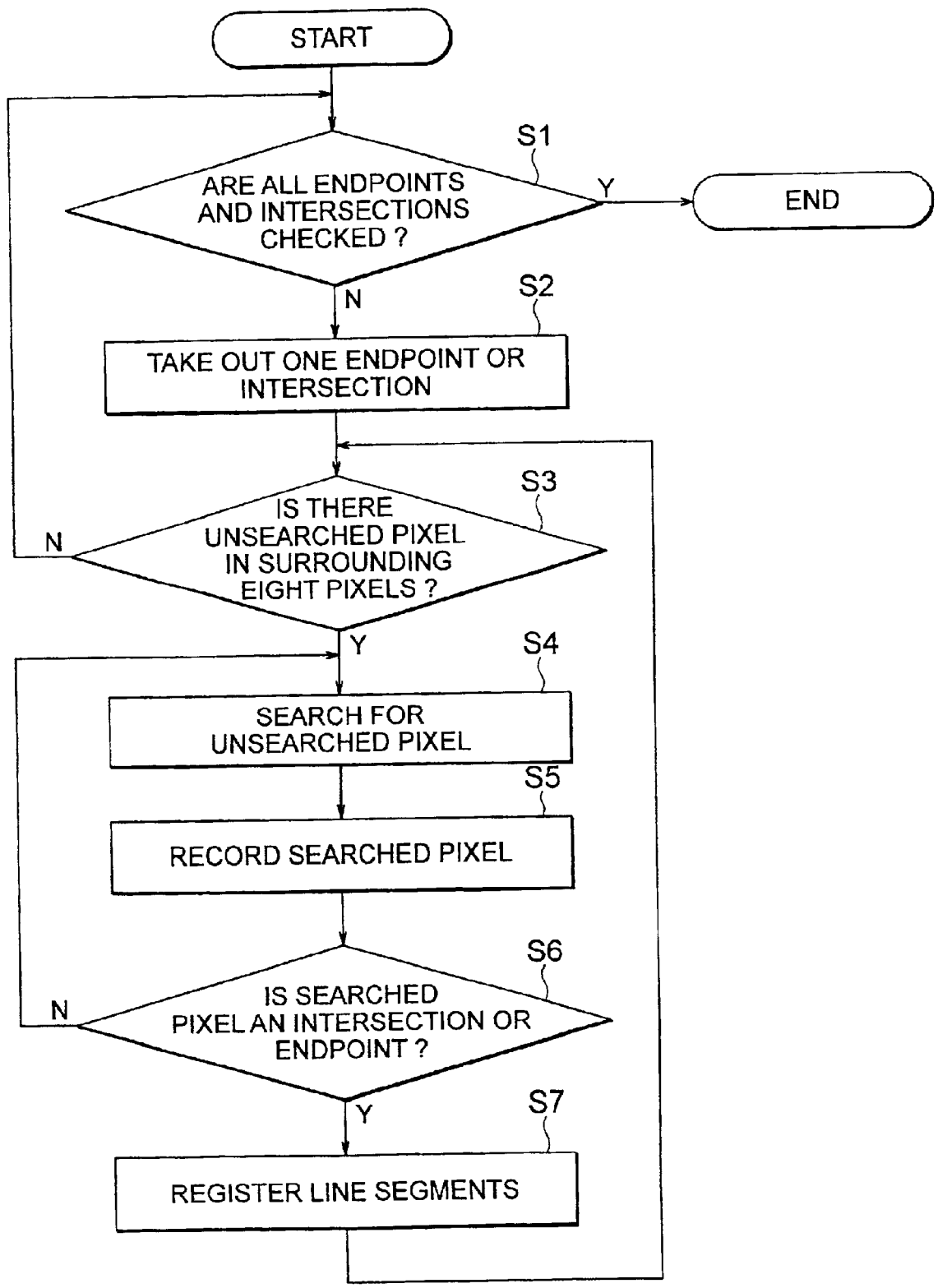
FIG. 8 is a flowchart showing a processing flow of a thinned image division at a point of intersection.

Referring to FIG. 8, a processing flow of the thinned image division at the intersection will be described below. First of all, it is determined whether or not all the endpoints and intersections are checked (S1 in FIG. 8). If all the endpoints and intersections are not checked, one endpoint or intersection is taken out (S2 in FIG. 8). Then, it is determined whether or not there is any unsearched pixel in eight pixels (eight pixels excluding a center pixel among nine pixels as shown in FIG. 7) around the noticing pixel (S3 in FIG. 8). If there is any unsearched pixel, one unsearched pixel is searched (detected) (S4 in FIG. 8). The searched pixel is memorized in the memory (not shown) (S5 in FIG. 8). Then, it is determined whether or not the searched pixel is an intersection or endpoint (S6 in FIG. 8). This determination is made by discriminating whether the pixel (black) around the pixel of notice corresponds to an endpoint pattern (an example of pattern as shown in FIG. 7A) or an intersection pattern (an example of pattern as shown in FIG. 7B). If it is determined to be the endpoint or intersection, the line segments including this point are registered (S7 in FIG. 8). Then the procedure returns to step S3, in which, when there is any unsearched pixel in eight pixels around the pixel of notice, the procedure transfers to step S4, while, when there is no unsearched pixel, the procedure returns to step S1, where the endpoint and intersection are further checked.

In the flow of FIG. 5, the fine line segment extension is performed at the next step S4. In the corresponding example of FIG. 6, each fine line segment is extended to the line width of the original image by this fine line segment extension, as illustrated at D.(1) to (11).

Figure 9:
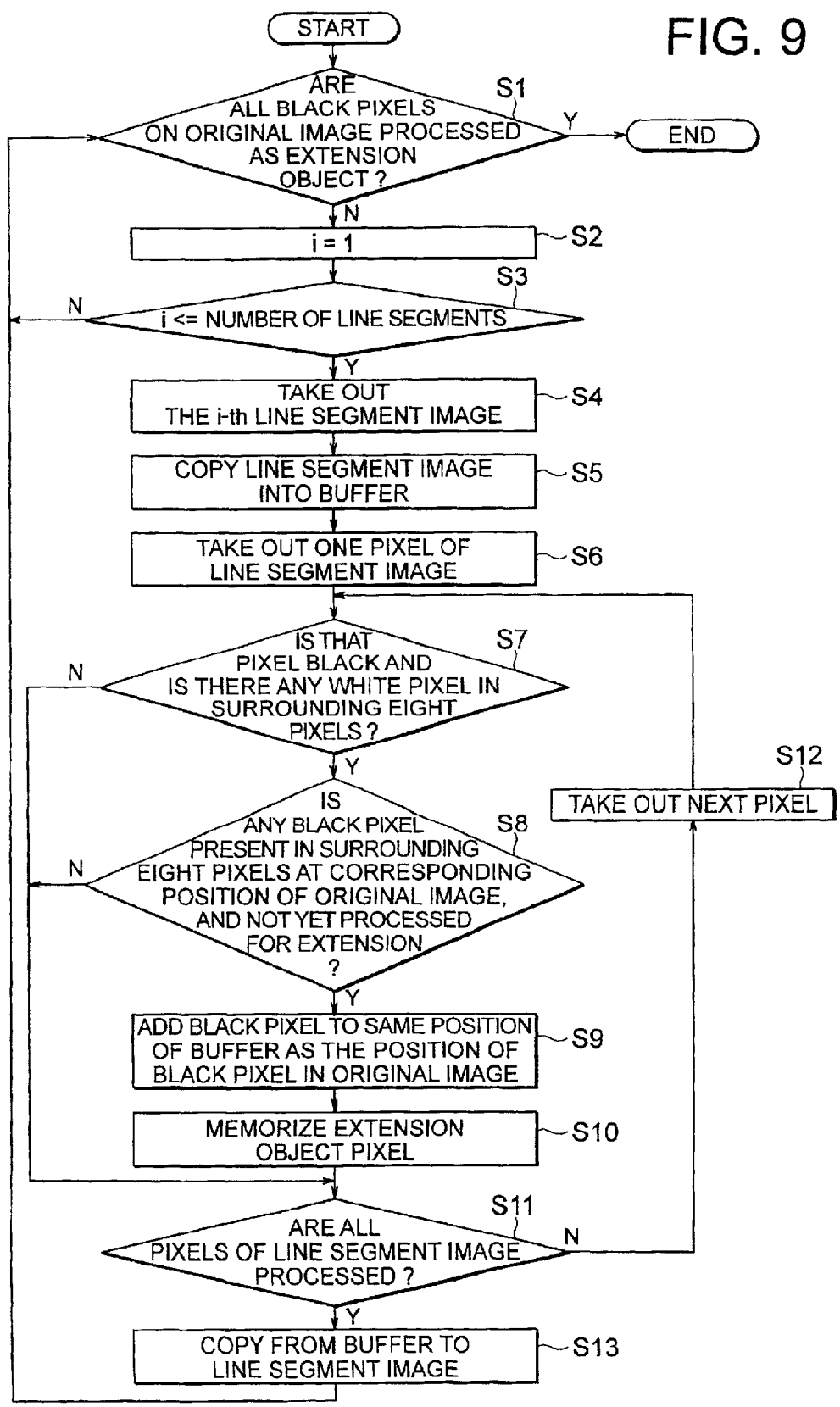
FIG. 9 is a flowchart showing a processing flow of a thinned line segment extension.

FIG. 9 is a processing flow of the fine line segment extension. First of all, the outline of the whole processing will be described below. The fine line segments is constructed as a line segment image at the early stage. Then, each pixel of the line segment image is noticed, and if the noticing pixel is an edge pixel (i.e., the noticing pixel is a black pixel and there is a white pixel in eight pixels around the noticing pixel), and there is a black pixel in surrounding eight pixels at the corresponding position on the original image, the black pixel is extended to the corresponding position of the fine line segment. This sequence of steps is repeated for all the line segments, which is a first stage processing. The pixels already extended are memorized to avoid being process in the processing at the next stage, when the first stage processing is ended. Then, in the case where the noticing pixel is an edge pixel for the line segment image extended at the first stage, if there is a black pixel in eight pixels adjacent to the corresponding position of the original image, the black pixel is extended to the corresponding position of the line segment image. This sequence of steps is repeated until the black pixels to be added are exhausted, thereby creating a line segment image with full line width.

In the details of the processing flow, it is firstly determined whether or not all the black pixels on the original image have been subjected to extension (S1 in FIG. 9). If all the black pixels are not subjected to extension, i is set to 1 where i is the line segment number (S2 in FIG. 9). Then, it is checked whether or not i exceeds the number of line segments (S3 in FIG. 9). If not, the i-th line segment image is taken out (S4 in FIG. 9). The line segment image is then copied into the buffer (S5 in FIG. 9), and one pixel of the line segment image is taken out (S6 in FIG. 9). Herein, it is determined whether or not the pixel is a black pixel and there is a white pixel in eight pixels around it (S7 in FIG. 9). If there is no white pixel, the procedure transfers to step S11 as described below, while if there is any white pixel, it is determined whether or not there is a black pixel in surrounding eight pixels at the corresponding position of the original image, and is not yet subjected to extension (S8 in FIG. 9). If the condition at step S8 is not satisfied, the procedure transfers to step S11, while if it is satisfied, the black pixel is added to the same position of the buffer as the position of the black pixel on the original image (S9 in FIG. 9). The extension pixel is memorized (S10 in FIG. 9). Then, it is determined whether or not all the pixels of the line segment image are processed (S11 in FIG. 9). If processed, the pixels are copied from the buffer onto the line segment image (S13 in FIG. 9), and then the procedure returns to step S1. The above sequence of steps is repeated until all the black pixels on the original image are subjected to extension.

The creation method of line segment image is not limited to the above method, so far as the original image is divided into the line segment information in minimum units in any form. For example, a method of dividing an area of black pixels connected in a unit of predetermined area may be employed.

Then, the character recognition processing is performed while changing the combination of line segment images in the line segment combination character recognizing unit (13 in FIGS. 1 and 2). Herein, a recognition image composed of the line segment images synthesized by a combination of line segments is created and subjected to character recognition. The character recognition result of each recognition candidate and its reliability are memorized, and the character having the maximum reliability among all the recognition results is selected as the ultimate recognition result. Herein, the reliability may be determined from a difference in distance from the dictionary or assuredness output by the character recognition processing or a likelihood.

Figure 10:
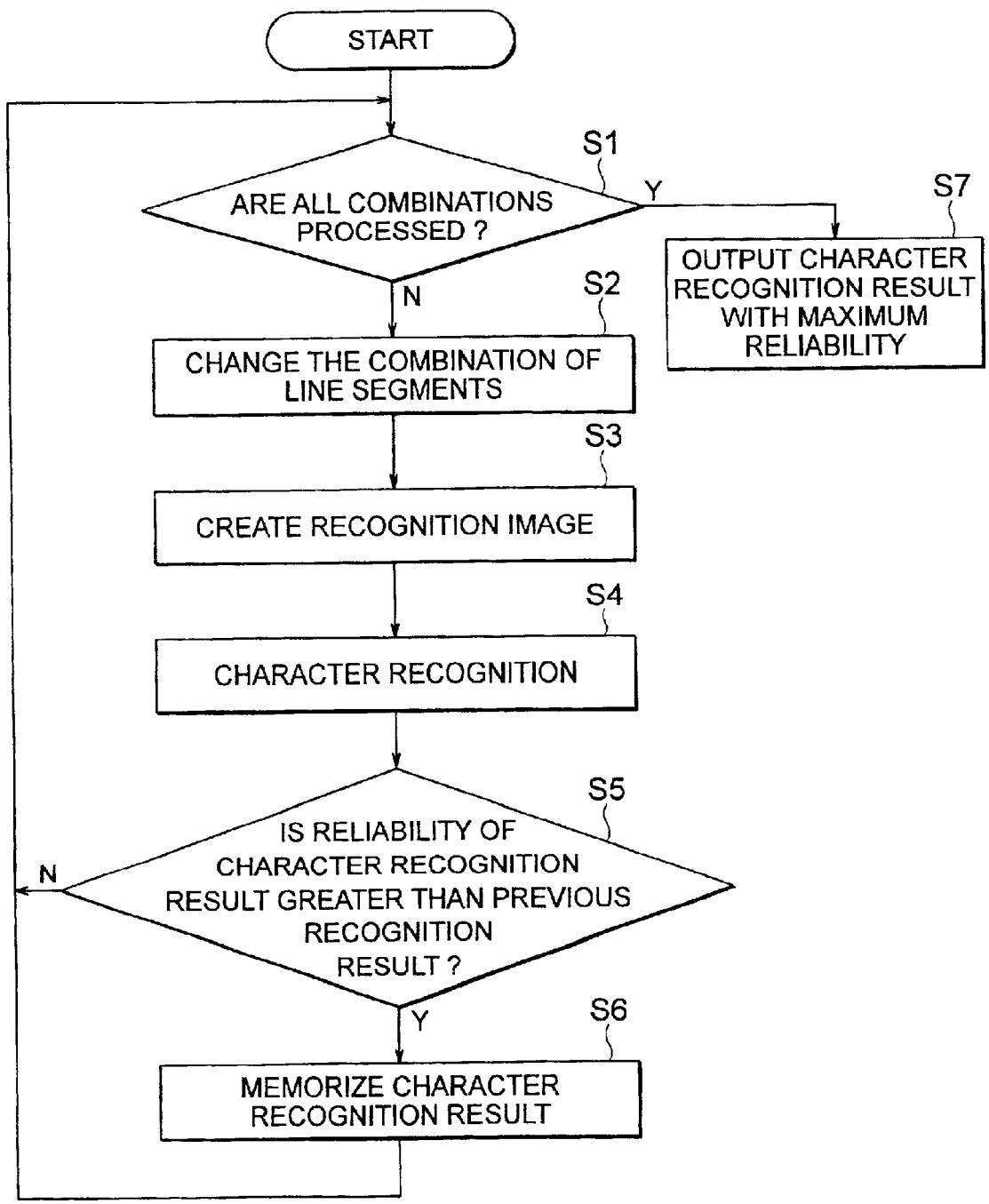
FIG. 10 is a flowchart showing a processing flow of a first line segment combination character recognition.

FIG. 10 is a processing flow of a first method for line segment combination character recognition. First of all, it is determined whether or not all the combinations are processed (S1 in FIG. 10). If all the combinations are not processed, the combination of line segments is changed (S2 in FIG. 10). a recognition image is created (S3 in FIG. 10), and subjected to the character recognition (S4 in FIG. 10). Then, it is determined whether or not the reliability of the character recognition result is greater than that of the previous recognition result (S5 in FIG. 10). If not, the procedure returns to step S1. If the reliability is greater than that of the previous recognition result, the character recognition result is memorized (S6 in FIG. 10), and then the procedure returns to step S1. When it is determined that all the combinations are processed at step S1, the character recognition result with the maximum reliability is output (S7 in FIG. 10).

In the first method for line segment combination character recognition, if n line segments are extracted, the number of possible combinations of line segments is in the order of $2^n$, and the character recognition processing must be made by this number of times. Therefore, it is required to reduce the number of combinations to decrease the number of recognitions, for which there are provided a plurality of methods as described below. These methods may be employed singly or in combination.

Second method for line segment combination character recognition

The second method for line segment combination character recognition takes into consideration the connectivity of the line segments. As its principle, it is checked whether or not all the line segments selected as the combination are connectable before the character recognition of each line segment, and only if connectable, the character recognition is performed, whereby the character recognition result with the maximum reliability is adopted, as illustrated at D. in FIG. 6.

Figure 11:
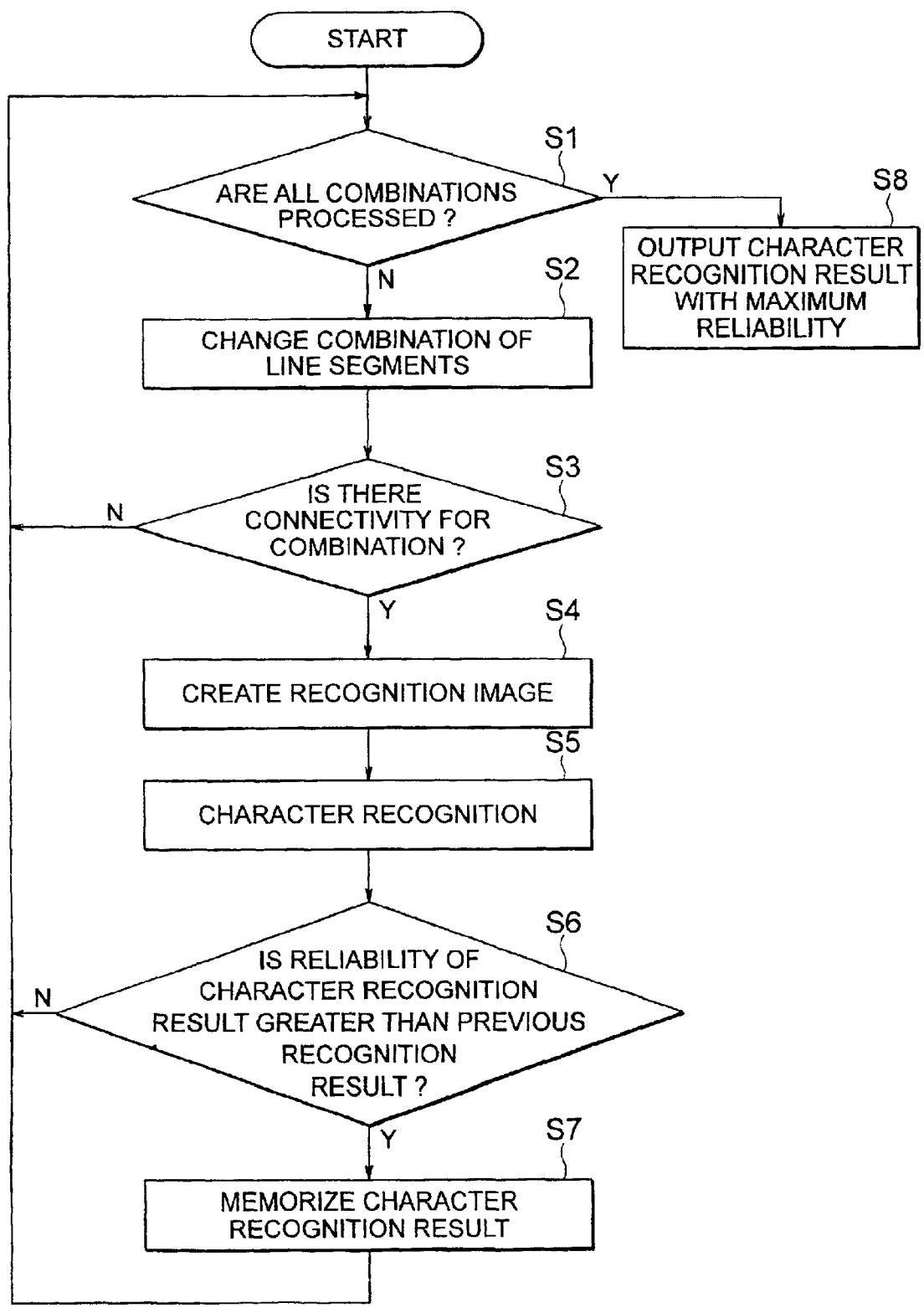
FIG. 11 is a flowchart showing a processing flow of a second line segment combination character recognition.

FIG. 11 is a processing flow of the second method for line segment combination character recognition. The steps S1 and S2 of FIG. 11 are the same as those of FIG. 10, except that in FIG. 11, when the combination of line segments is changed at step S2, it is checked whether or not the combination has the connectivity at step S3. The details of this check are shown in the processing flow of FIGS. 12 and 13 as described below. If no connectivity is determined at this check, the procedure returns to step S1, while if the connectivity is determined, the creation of recognition image (S4 in FIG. 11), character recognition (S5 in FIG. 11), determination whether or not the reliability of character recognition result is greater than that of the previous recognition result (S6 in FIG. 11), and memorizing the character recognition result when the reliability is greater than that of the previous recognition result (S7 in FIG. 11) are executed in accordance with the same processing flow following step S3 in FIG. 10.

Figure 12:
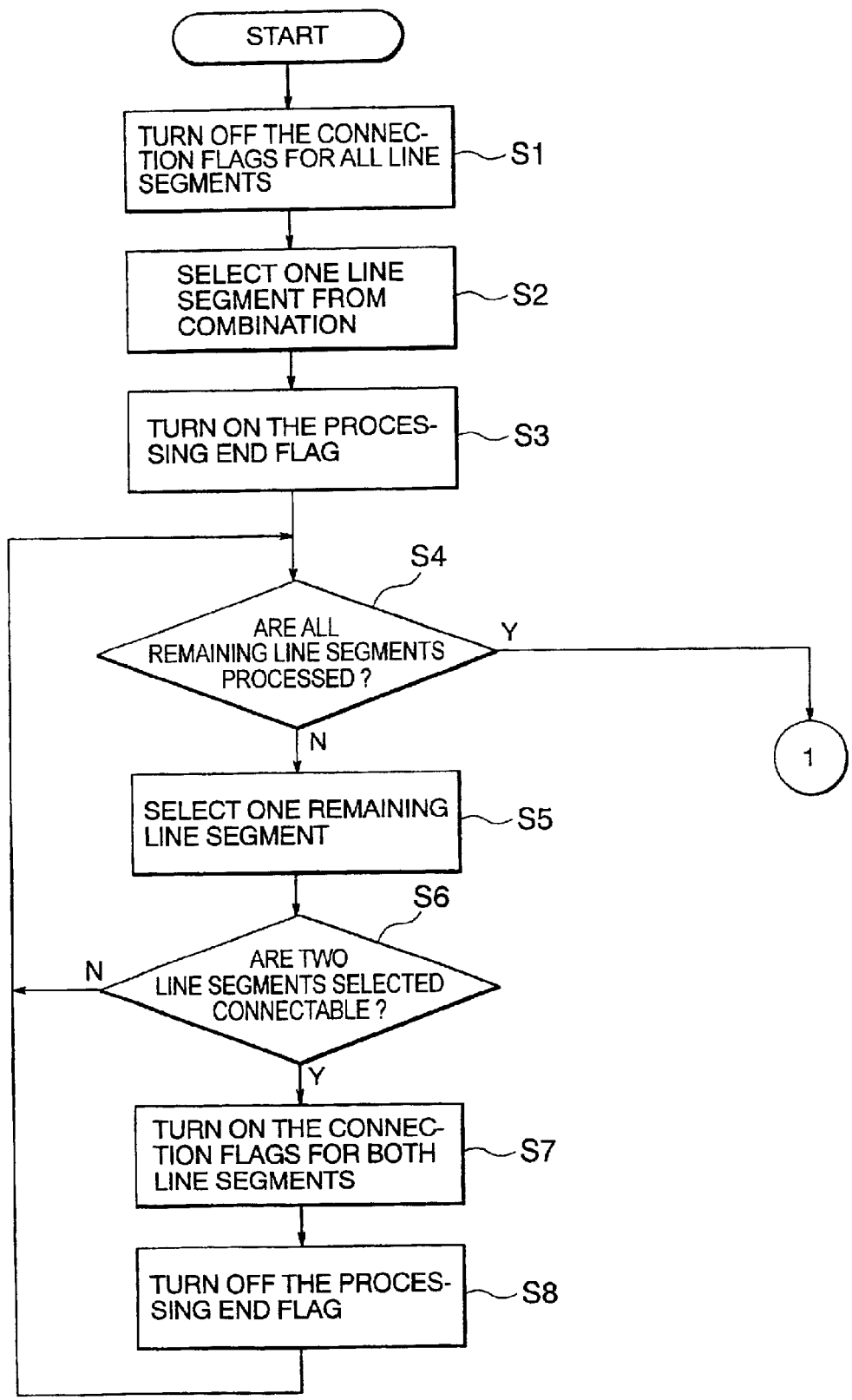
FIG. 12 is a flowchart showing a processing flow (no. 1) of a line segment connectivity check.
Figure 13:
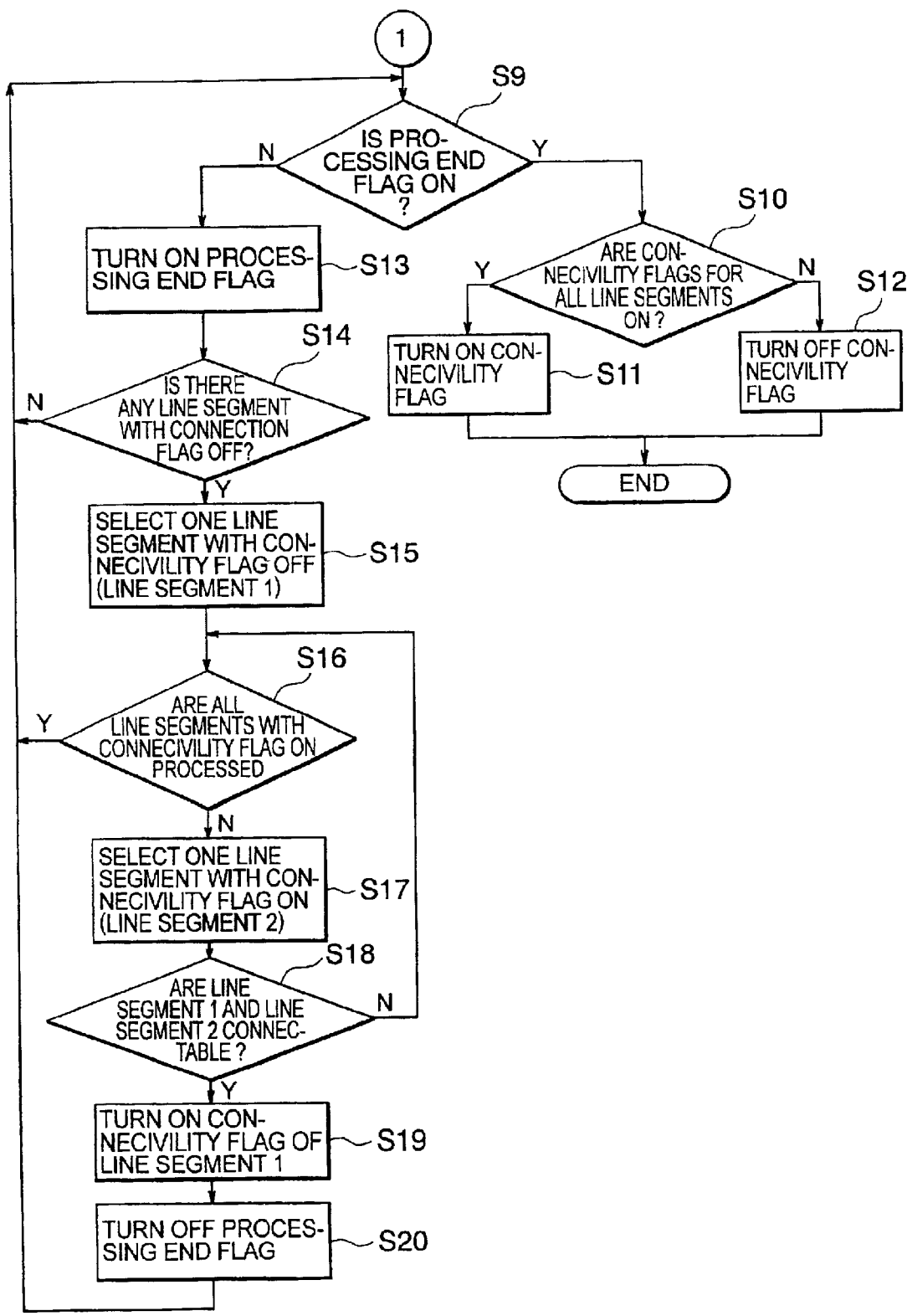
FIG. 13 is a flowchart showing a processing flow (no. 2) of a line segment connectivity check.

FIGS. 12 and 13 are the processing flows (No. 1) and (No. 2) for checking the connectivity of line segments.

First of all, the connectivity flag for all the line segments is turned off (S1 in FIG. 12). Then, one line segment is selected from the combination (S2 in FIG. 12). Then a processing end flag is turned on (S3 in FIG. 12). It is determined whether or not all the remaining line segments are processed (S4 in FIG. 12), in which if all the remaining line segments are not processed, one remaining line segment is selected (S5 in FIG. 12). Then, it is determined whether or not the selected two line segments are connectable (S6 in FIG. 12). If not connectable, the procedure transfers to step S4. On the other hand, if connectable, a connection flag of both line segments is turned on (S7 in FIG. 12), the processing end flag is turned off (S8 in FIG. 12), and the procedure returns to step S4. When the connection flag is on, it is meant that the line segment has the connection with other line segment, or otherwise, it is meant that the line segment has no connection with other line segment. Also, if the processing end flag is on, the procedure proceeds from step S9 to step S10 in FIG. 13, which is explained in the following, or otherwise, the procedure goes to step S13.

If it is determined at step S4 that all the remaining line segments are processed, the procedure transfers to step S9 to determine whether or not the processing end flag is on (S9 in FIG. 13). If the processing end flag is on at step S9, it is further determined whether or not the connection flag for all the line segments is on (S10 in FIG. 13). If the connection flag for all the line segments is on, the connectivity flag is turned on (S11 in FIG. 13), or if it is not on (i.e., off), the connectivity flag is turned off (S12 in FIG. 13). If the processing end flag is not on at step S9, the processing end flag is turned on (S13 in FIG. 13). Then, it is determined whether or not there is any line segment with the connection flag being off (S14 in FIG. 13). If there is no such line segment, the procedure returns to step S9 to determine whether the processing end flag is on or off. If the processing end flag is on, the procedure goes to step S10, or otherwise, to step S13. If there is any line segment with the connection flag off at step S14, one line segment with the connection flag off is selected (S15 in FIG. 13). This line segment is referred to as the line segment 1. Then, it is determined whether or not all the line segments with the connection flag on are processed (S16 in FIG. 13), in which if all the line segments with the connection flag on are processed, the procedure returns to step S9, or otherwise, one line segment with the connection flag on is selected (S17 in FIG. 13). This line segment is referred to as the line segment 2. Then, it is determined whether or not the line segment 1 and the line segment 2 are connectable (S18 in FIG. 13), in which if they are not connectable, the procedure returns to step S16, or if they are connectable, the connection flag of the line segment 1 is turned on (S19 in FIG. 13), the processing end flag is turned off (S20 in FIG. 13), and then the procedure returns to step S9.

Figure 14:
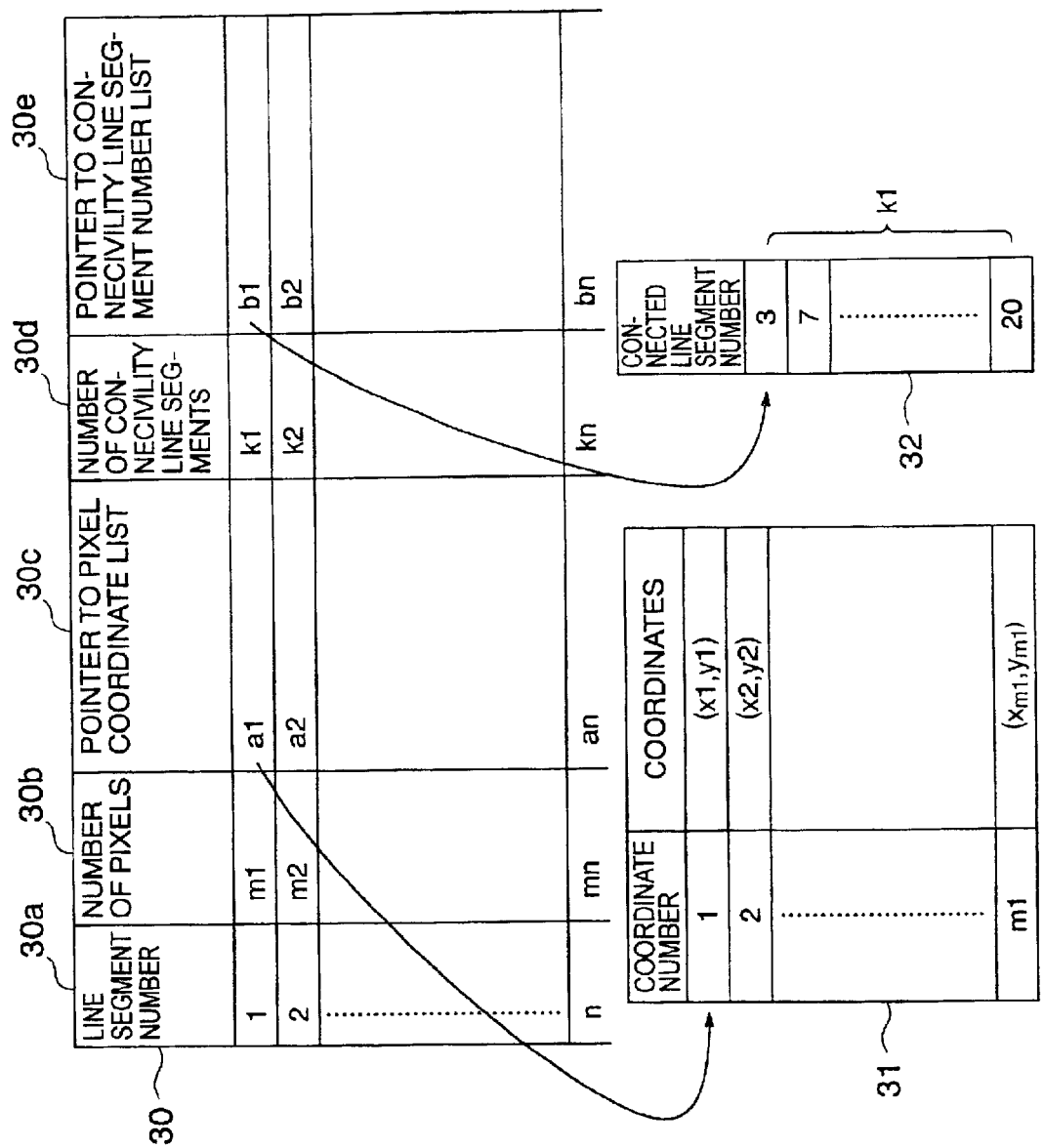
FIG. 14 is a diagram showing a data structure of line segment for recording a connected line segment number.

FIG. 14 shows the data structure of line segment recording the connected line segment number recorded. In the drawing, reference number 30 denotes the line segment data, 31 denotes a list of pixel coordinates, and 32 denotes a list of connected line segment numbers. The line segment data 30 is composed of items 30a to 30e. The item 30a is the line segment number, 30b is the number of pixels, 30c is a pointer to the list of pixel coordinates, 30d is the number of connected line segments, and 30e is a pointer to the list of connected line segment numbers. With this data structure, the number of pixels (m1, m2, and so on) is set for each line segment number, the pixel coordinate list 31 of pixels constituting the line segment can be accessed using the pointer 30c, and the connected line segment number list 32 including the number of connected line segments (k1, k2 and so on) and the connected line segment number can be accessed by the pointer 30e.

FIG. 15 is a view showing an example of reducing the number of recognitions with the connectivity of the line segment image. That is, for an original image (a), if there is no connectivity for a combination of line segments selected as in (b), the character recognition processing is not performed, while if there is any connectivity for a combination of line segments selected as in (c), the character recognition processing is performed. Thereby, the number of character recognitions can be reduced by the number of times in which the line segments are not connectable. A confirmation method for the connectivity involves memorizing the number of other line segment connecting at a point (intersection) of dividing into thinned line segments in creating the thinned line segments. Before combining the line segments and performing the character recognition, it can be confirmed whether or not the line segments selected as the combination are connected on the basis of that memorized information, and only if connected, the character recognition is performed, thereby making it possible to reduce the number of character recognition processing.

Third method for line segment combination character recognition method

A third method for line segment combination character recognition relies on such a condition that in the case where it is presumed that a part or all of the preprint information has smaller line width than the characters for recognition (handwritten), as a principle, the line segments having smaller line width are removed from an original image, as a preprocessing for applying the character recognition method of the invention.

The removal method comprises scanning the image in horizontal and vertical directions to calculate the distribution of black pixels in run (width), and removing the portion with small run, whereby the preprint information for the fine line segment portion can be deleted. Thereby, when this method is applied, the number of line segments can be reduced, and accordingly the number of line segment combinations for the recognition is decreased and the calculation time can be shortened.

FIG. 16 is an explanatory view of the image deletion for deleting a portion of image with small line width, in which an example in the vertical direction is shown.

FIG. 16A shows an example in which an image of symbol "+" (meaning number 10 in Japanese character) is printed in the Ming-style type as the preprint information, and FIG. 16B shows a run distribution when this image is scanned in the vertical direction, in which the numbers "1", "2", "a" and "9" indicate the length of black pixels at each position in hexadecimal, when scanned in the vertical direction. In this example, the line width of symbol "+" in the transversal direction is equal to a length of one pixel, whereby it can be found that this line is a fine line segment. This transversal line segment with a line width of one pixel in the vertical direction is removed, thereby producing an image (c).

FIG. 17 shows a specific example in which the preprint information with fine line width is removed. FIG. 17A shows an original image in a recognition object area, or the same image as that with the character "5" entered in the document as shown by A. in FIG. 6, wherein a part of character 千 "thousand" with fine line width is included as the preprint information. FIG. 17B shows an image after the fine line segments are removed from the original image (a), whereby the number of line segment combinations can be reduced. Besides this method, it is possible to employ a method for removing the line segments with smaller line width by obtaining the line width in such a manner as to calculate the line width of line segment after division appropriately with respect to the direction of line segment.

Fourth method for line segment combination character recognition

With this method, when an area for writing the character for recognition is known in advance or as a result of layout analysis, the line segments contained in the area is necessarily included in determining the combination of line segments. Thereby, the number of line segment combinations can be reduced, and the number of character recognitions can be decreased.

FIG. 18 shows an example in which the character entry area is known in advance. In the figure, the line segments within the character entry area as indicated by the dotted line are necessarily included in the combination of line segments for character recognition, and the combination of line segments outside the area is changed.

Fifth method for line segment combination character recognition

The fifth method for line segment combination character recognition is one in which the short line segment with the endpoint at one end is not included in the combination of line segments for recognition. The short line segment with the endpoint at one end occupies a small area in the proper character, and even if this is not included, the result of character recognition is not much effected. Accordingly, the number of line segment combinations can be reduced and ultimately the number of character recognitions can be decreased, if the short line segment with the endpoint at one end is not included in the candidate for combination.

With this fourth method for line segment combination character recognition, if the types of both ends (line segment from the endpoint to the three point intersection or four point intersection, line segment from the endpoint to the endpoint), and the length of line segment are included as the line segment data, the processing can be simplified.

Figure 19:
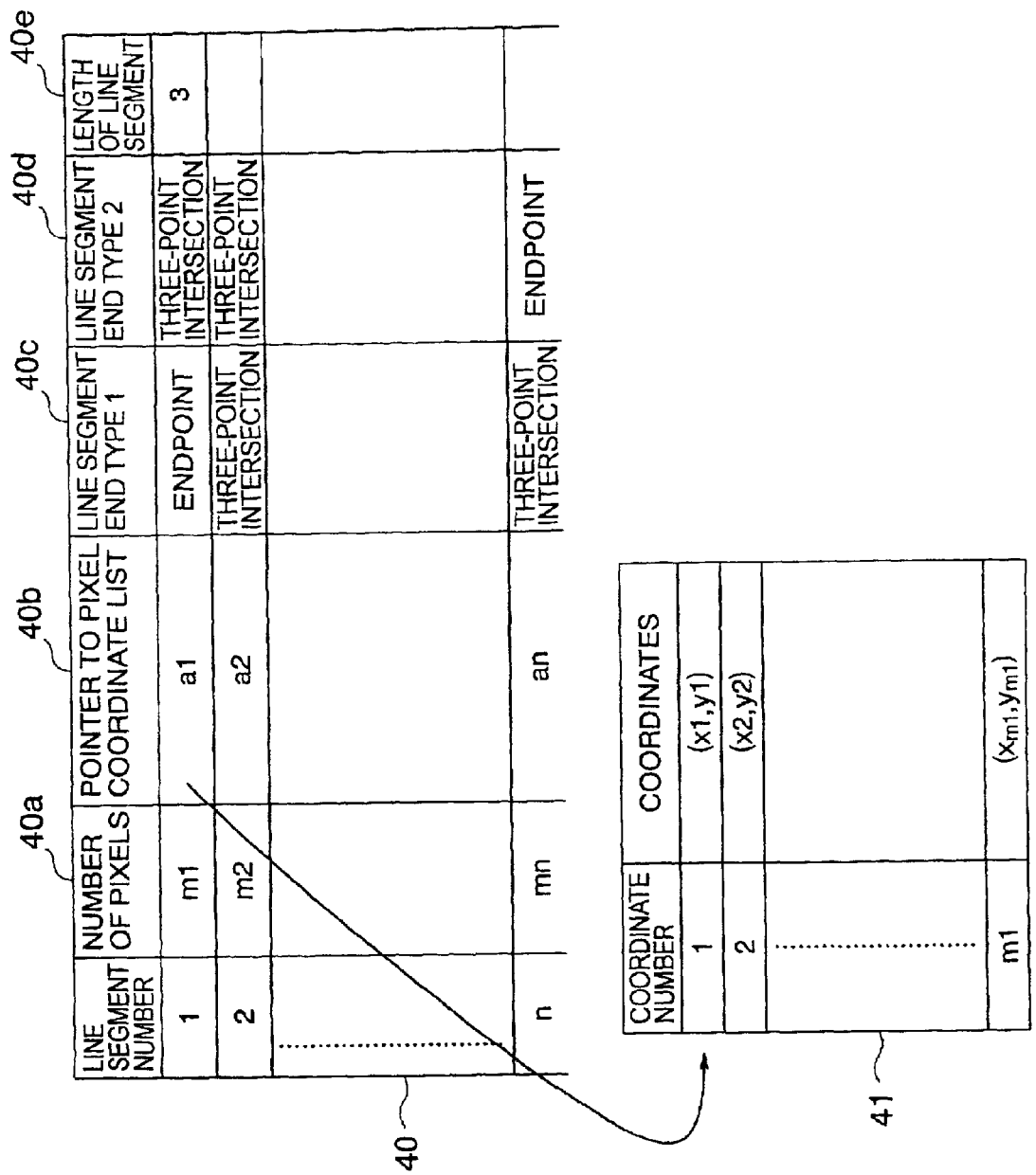
FIG. 19 is a diagram showing a data structure of line segment having types of line segment both ends and the length of line segment.

FIG. 19 shows the data structure of line segment having the types of both ends of line segment and the length of line segment. The data structure 40 comprises, corresponding to the line segment number attached to each line segment, the number of pixels 40a (m1, m2 and so on), the pointer to pixel coordinate list 40b (a1, a2 and so on), the line segment end type 1 of 40c (type of one endpoint of line segment), the line segment end type 2 of 40d (type of other endpoint of line segment), and the length of line segment of 40e, and the coordinate list 41 is specified by pointer 40b. A coordinate list 41 contains the coordinates corresponding to each coordinate number, the number of entries being equal to the number of pixels making up the line segment with the line segment number. Also, the line segment end type 1 and type 2 may be the endpoint, the three point intersection and so forth.

Figure 20:
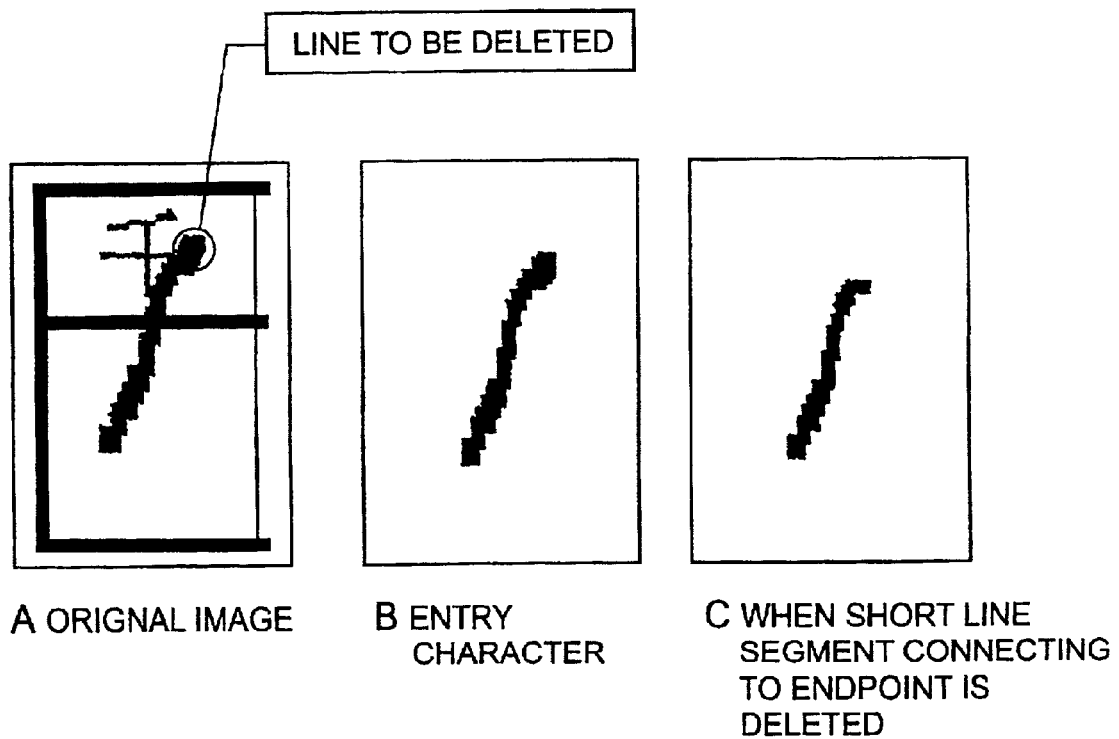
FIG. 20 is a view showing a specific example of a fifth method of line segment combination character recognition.

FIG. 20 shows a specific example of the fifth method for line segment combination character recognition. This example has an original image as indicated by A. in FIG. 20, where "1" is handwritten on the character 千 "thousand" in the Ming-style type as the preprint information. An entry character is indicated by B. in the same figure. This character is decomposed into line segments, such as a line segment at the upper tip of "1," and the short line segments with the endpoint at one end are deleted, as the result a line segment like shown by C is obtained. The the line segment is subjected to the character recognition.

Sixth method for line segment combination character recognition

The sixth method for line segment combination character recognition involves checking the size of a graphic created by the combination of line segments beforehand, executing the character recognition only if the size of the graphic created is within a predetermined range, and utilizing the character recognition result with the maximum reliability among the combinations of line segments. If the upper limit or the lower limit of the size of entry characters, or both limits, can be supposed, this method allows the reduction in the number of character recognitions. In this case, the size of graphic may be the area of the circumscribing rectangle for the graphic created by the combination of line segments, or the height of the graphic.

Figure 21:
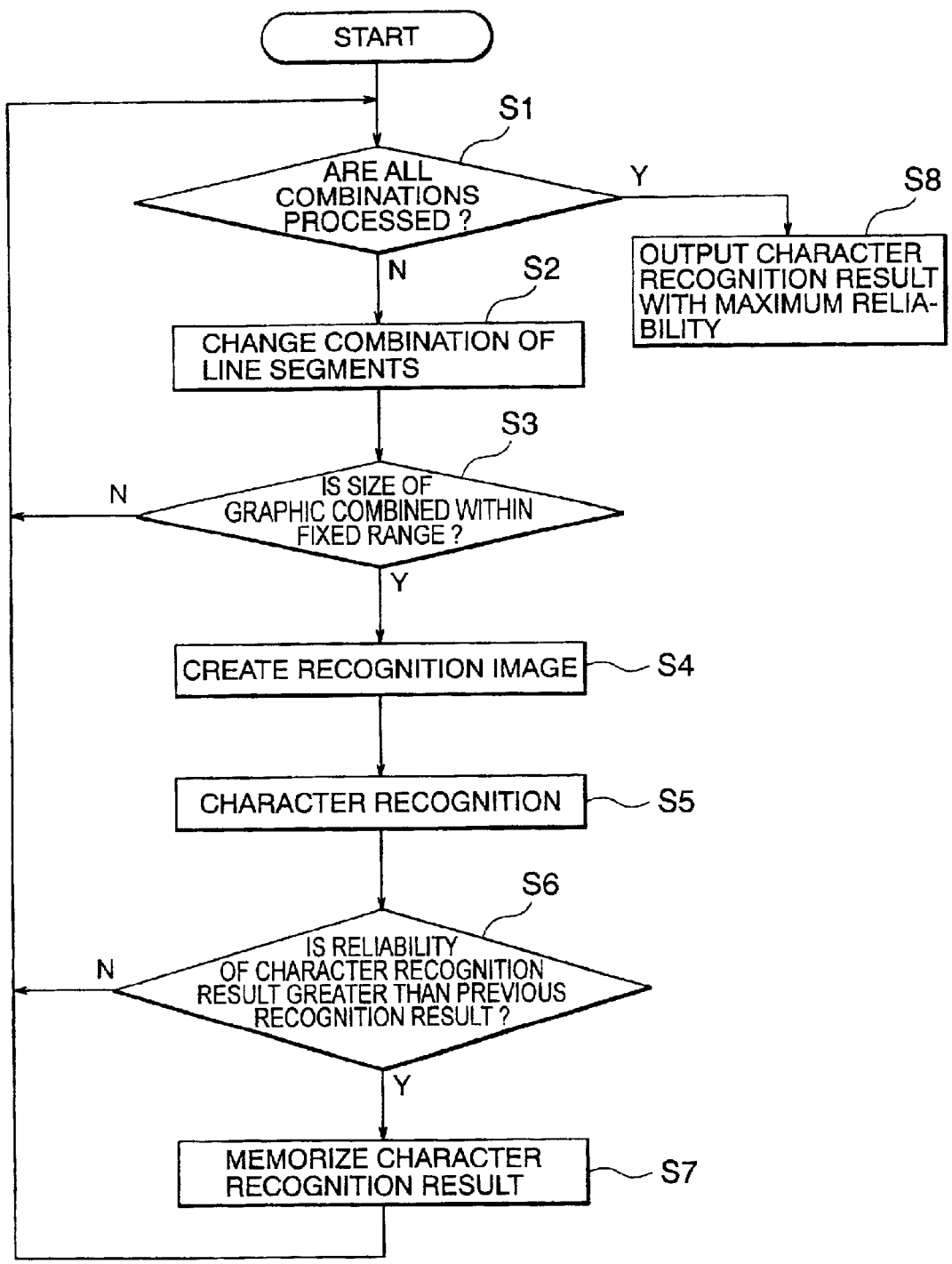
FIG. 21 is a flowchart showing a processing flow of a character recognition in view of a size of a graphic composed of a combination of line segments.

FIG. 21 is a processing flow of the character recognition in consideration of the size of graphic composed of the combination of line segments. First of all, it is determined whether or not all the combinations are processed (S1 in FIG. 21). If all the combinations are not processed, the combination of line segments is changed (S2 in FIG. 21). Then, it is determined whether or not the size of graphic composed of the combination of line segments is within a predetermined range (S3 in FIG. 21). If not within the predetermined range, the procedure returns to step S1, or if within the predetermined range, a recognition image is created (S4 in FIG. 21), and subjected to the character recognition (S5 in FIG. 21). Then, it is determined whether or not the reliability of the character recognition result is greater than that of the previous recognition result (S6 in FIG. 21). If the reliability is greater than that of the previous recognition result, the character recognition result is memorized (S7 in FIG. 21), or otherwise, the procedure returns to step S1. When all the combinations have been processed, the character recognition result with the maximum reliability is output (S8 in FIG. 21).

For example, in the case where the character entry area for entering the character is given such as the document as shown in FIG. 18, the size range of the entry characters is predetermined, and if there is any combination of line segments for the size outside this range, the character recognition processing is not performed, thereby reducing the number of character recognition.

The processing of recognition result exchange that is performed in the recognition result exchange unit 14 provided in the second principle configuration (FIG. 2) of the invention will be described below by reference to the drawings corresponding to the methods (1) to (4) as described above.

Herein, in a processing flow (FIGS. 9 and 10) corresponding to the line segment combination character recognizing unit 13 of FIG. 2, the character recognition is performed while changing the combination of line segments, the reliability (or similarity) for each recognition result as a candidate character is calculated, the candidate character with the maximum reliability is output as the optimal character recognition result. In this case, besides the recognition candidate character with the maximum reliability, a predetermined number of recognition candidates with the higher reliability in the order from among the recognition candidates obtained in a process of recognizing the character by combining the line segments are memorized in the memory (21 in FIG. 3).

Figures 22, 23:
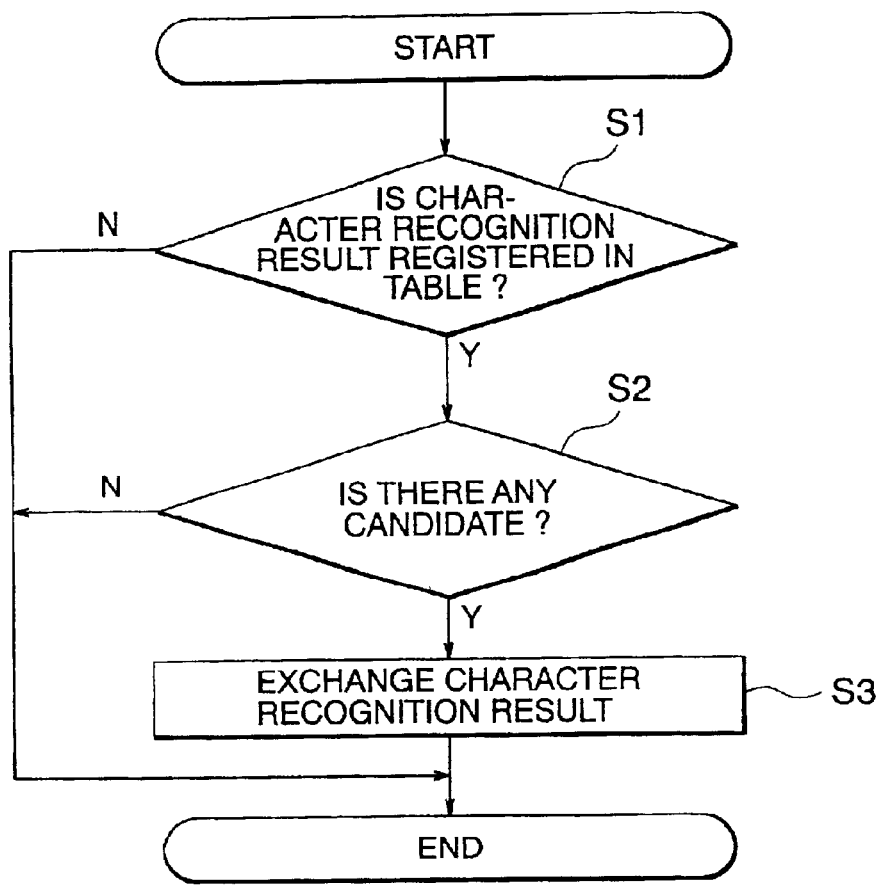
FIG. 22 is a flowchart of an example 1 of a recognition result exchange.
FIG. 23 is a view showing a reference table for exchanging a character recognition result in the example 1.

FIG. 22 is a flowchart of an example 1 of the recognition result exchange. FIG. 23 is a reference table of the character recognition result exchange in the example 1. The flowchart of the example 1 of FIG. 22 corresponds to the exchange method of the character recognition result in (1) as described above with reference to FIG. 2.

First of all, it is determined whether or not the received character recognition result is registered as the exchanged object character in the reference table (FIG. 23) (S1 in FIG. 22). If it is not registered as the exchanged object character, the procedure is ended without exchange, while if it is registered, it is determined whether or not there is any recognition candidate (stored in the memory) besides the recognition result character as the exchanging object character corresponding to the exchanged object character in the reference table (S2 in FIG. 22). If there is no recognition candidate, the procedure is ended without exchange, while if there is any recognition character, the recognition result character is exchanged by the character of recognition candidate (i.e., candidate with higher reliability next to the recognition result) (S3 in FIG. 22). If at step S2, there are a plurality of recognition candidate characters for the exchanged object character, the recognition result character is exchanged by the character with the highest reliability.

Figures 24, 25:
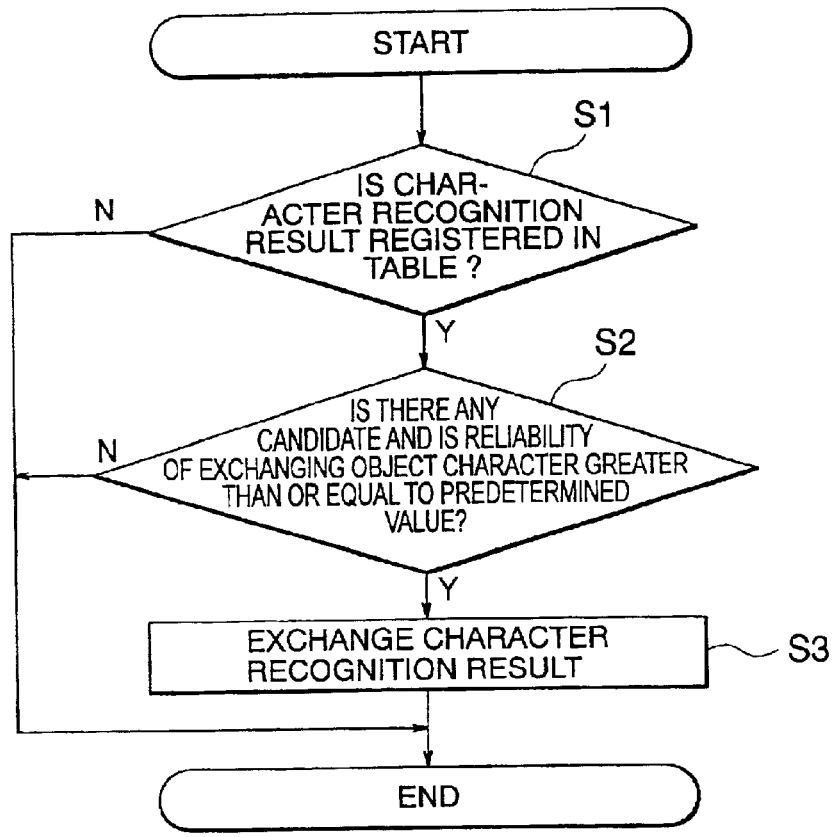
FIG. 24 is a flowchart of an example 2 of the recognition result exchange.
FIG. 25 is a view showing a reference table for exchanging the character recognition result in the example 2.

FIG. 24 is a flowchart of an example 2 of the recognition result exchange. FIG. 25 is a reference table of the character recognition result exchange in the embodiment 2. The reference table of the embodiment 2 sets exchanging object characters corresponding to the exchanged object character with the reliability when exchanged by the exchanging object character. The flowchart of the embodiment 2 of FIG. 24 corresponds to the exchange method of the character recognition result in (2) as described above with reference to FIG. 2.

First of all, it is determined whether or not the character recognition result is registered as the exchanged object character in the reference table (FIG. 25) in the same manner as described above and shown in FIG. 22 (S1 in FIG. 24). If it is not registered as the exchanged object character, the procedure is ended without any exchange, while if it is registered, it is determined whether or not there is any recognition candidate with the next lower reliability besides the recognition result character as the exchanging object character corresponding to the exchanged object character in the reference table and the reliability of the exchanging object character (stored in the memory in the recognition operation) is greater than or equal to a predetermined value set for the exchanging object character in the reference table (FIG. 25)(S2 in FIG. 24). If it is greater than or equal to the predetermined value, the exchanged object character is exchanged by the exchanging object character (S3 in FIG. 24), while if there is no recognition candidate, or the reliability is below the predetermined value even if there is any candidate, the procedure is ended.

The "reliability" set in the reference table of FIG. 25 may be implemented by using the distance value of a characteristic vector that is output by the character recognition processing etc., but must be adjusted to appropriate values in accordance with the character recognition processing system or the characters to be exchanged. The value of reliability for exchanging can be set as shown in the reference table of FIG. 25 by learning in advance. The recognition reliability for the exchanging object character as well as the difference in the reliability of the exchanged object character may be laid down as the conditions.

Figure 26:
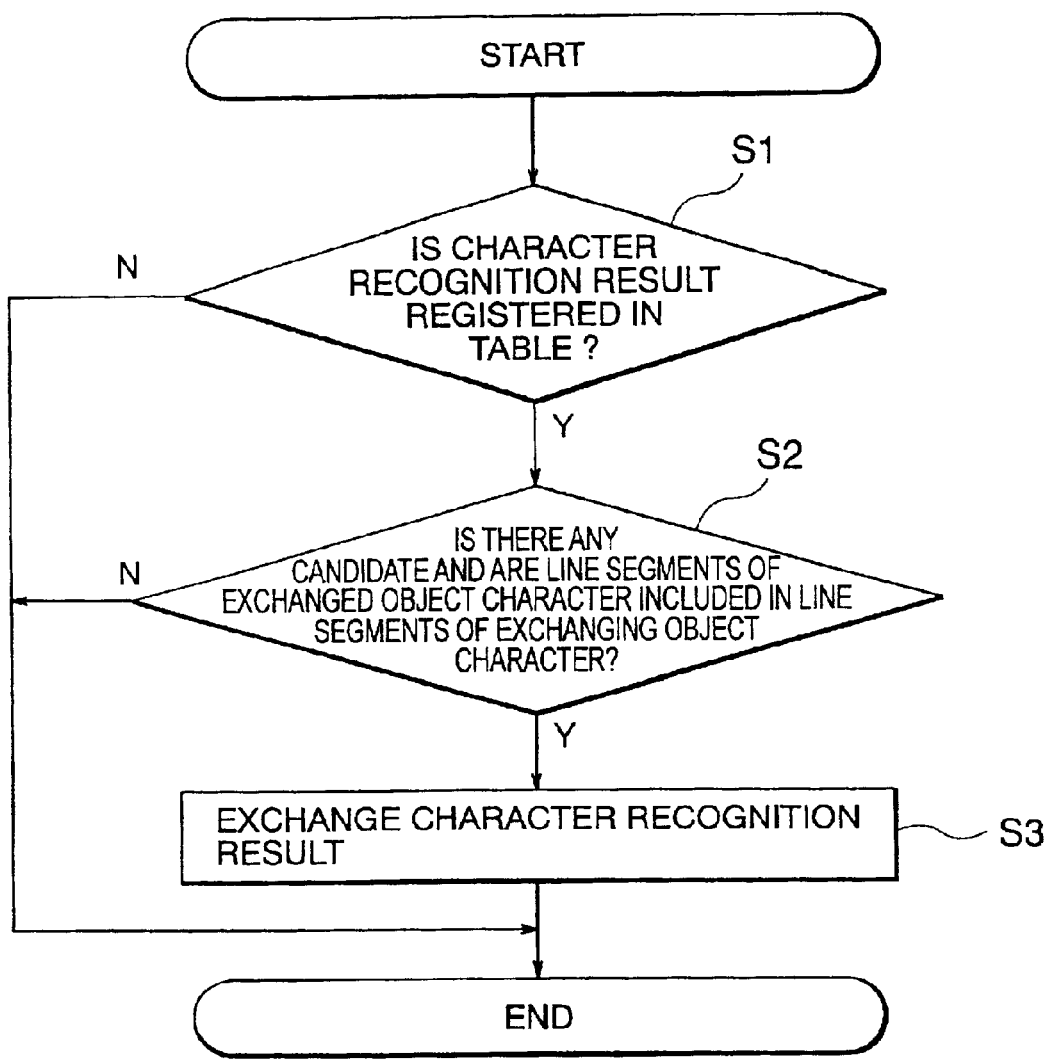
FIG. 26 is a flowchart of an example 3 of the recognition result exchange.

FIG. 26 is a flowchart of an embodiment 3 of the recognition result exchange.

This flowchart of the example 3 of the recognition result exchange corresponds to the exchange method of character recognition result in (3) as described above and shown in FIG. 2. In the method of the example 1 as described above and shown in FIG. 22, the character recognition result is exchanged in the case where the character recognition result is the exchanged object character registered in the reference table, and the character coincident with the exchanging object character registered in the table is recognized as the candidate in the process of character recognition. However, in this example 3, it is determined whether or not the line segments constituting the exchanged object character are included in the line segments constituting the exchanging object character, when exchanging, as indicated at step S2 in FIG. 26, and if included, the character recognition result is exchanged (S3 in FIG. 26).

For example, in an example of FIG. 29A, where "1" is output as the character recognition result, because "1" is registered in the reference table of exchanged object characters (see FIGS. 23 and 25), it is checked whether or not there is any recognition candidate for any one of the exchanging object characters "4", "7" and "9". If there is any recognition candidate, the recognition result is exchanged when the line segments constituting "1" are included in the line segments constituting the candidate character. Thereby, when the false character recognition result is obtained by a partial pattern of character, the recognition result can be replaced with the correct character, so the reliability of character recognition can be enhanced.

Suppose a case where since the transversal line crosses "0" as indicated by (c) in FIG. 29, the character recognition result is "6". In this case, if "0" exists as the recognition candidate, the line segments of the convex portion for the graphic forming "6" are obtained, and the line segments contributing to formation of the convex portion are extracted. If they are included in the line segments forming the recognition candidate of "0", the recognition result is exchanged, considering that "0" is an exchanged object character and "6" is an exchanging object character. Further, in a case where for a graphic with "0" crossed by the transversal ruled line, "8" is output as the character recognition result, the recognition result may be exchanged in the same manner as above, considering that "0" is an exchanged object character and "8" is an exchanging object character.

Figure 27:
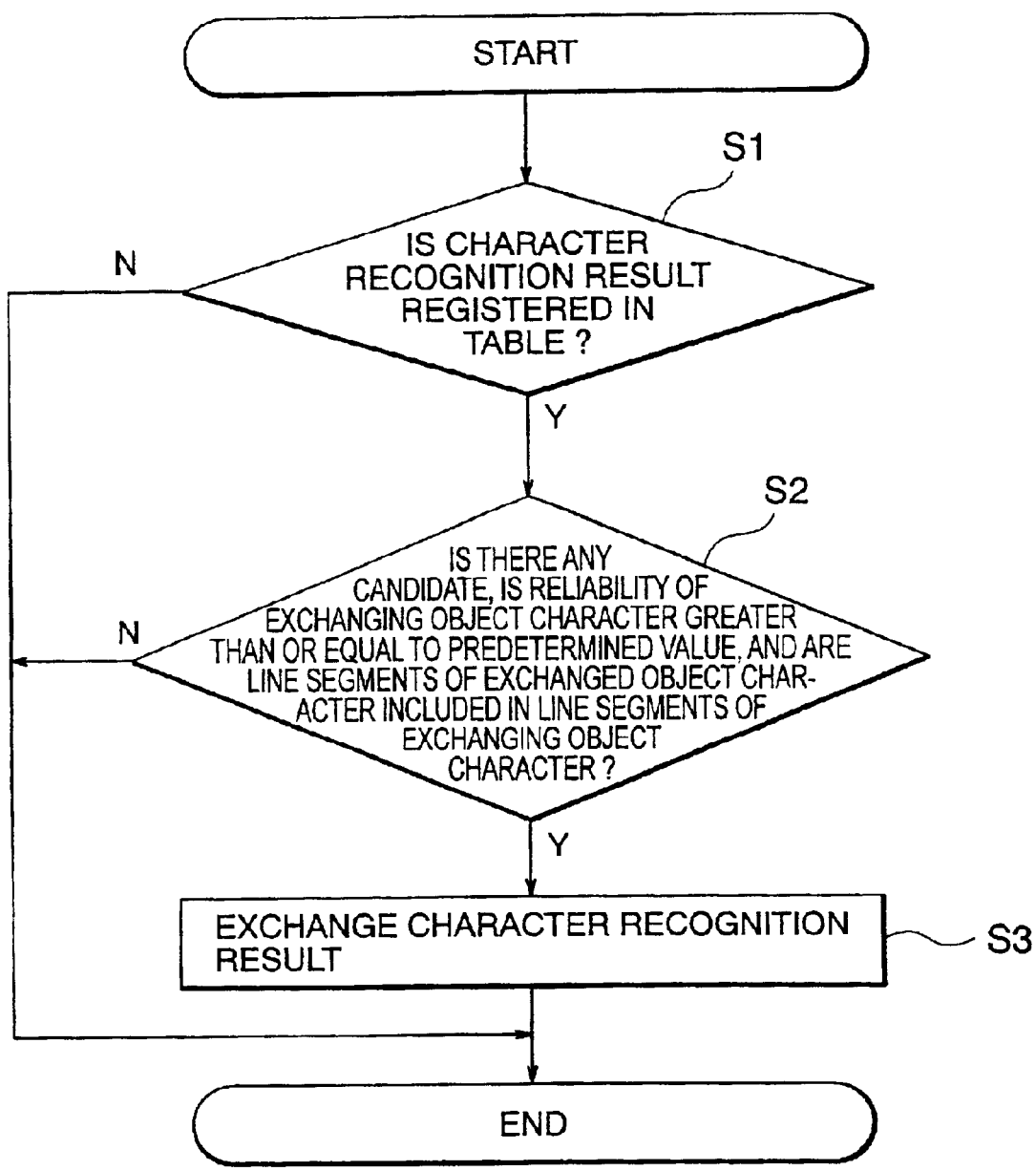
FIG. 27 is a flowchart of an example 4 of the recognition result exchange.

FIG. 27 is a flowchart of an embodiment 4 of the recognition result exchange.

This flowchart of the embodiment 4 of the recognition result exchange corresponds to the exchange method of character recognition result in (4) as described above and shown in FIG. 2. This embodiment 4 is a combination of the embodiment 2 (FIG. 24) and the embodiment 3 (FIG. 26). That is, it is determined whether or not the character recognition result is any exchanged object character registered on the table (S1 in FIG. 27). If registered, it is then determined whether or not the character coincident with the exchanging object character registered on the table is recognized as the candidate in the recognition process, the reliability of character to be exchanged with the character recognition is higher than a predetermined value (see the table of FIG. 25), and the line segments constituting the exchanged object character are included in the line segments constituting the exchanging object character (S2 in FIG. 27). If all the above conditions are satisfied, the character recognition result is exchanged (S3 in FIG. 27).

With this example 4, the modification reliability of exchanging the character recognition result can be further enhanced.

The flows as shown in FIGS. 8 to 13, FIGS. 21 and 22, FIG. 24, and FIGS. 26 and 27, and the functions as described in the operation explanation, can be implemented in the information processing apparatus (computer) as shown in FIG. 3 with the programs stored in the memory, ROM, or the recording medium such as the flexible disk, or downloaded from the outside into the memory via the communication device.

The many features and advantages of the present invention are apparent from the detailed specification and, thus, it is intended by the appended claims to cover all such features and advantages of the invention which fall within the true spirit and scope of the invention. Further, since numerous modification and changes will readily occur to those skilled in the art, it is not desired to limit the invention o the exact construction and operation illustrated and described, and accordingly all suitable modification and equivalents falling within the scope of the invention may be included in the present invention.

What is claimed is:

1. A character recognition method for recognizing characters entered in a document or the like including preprint information, comprising:

dividing an image in an area where the characters to be recognized are present into line segments individually, wherein the image is obtained by reading said preprint information and the entry characters;

creating a recognition image by changing a combination of a plurality of line segments divided;

memorizing a recognition result with reliability by making the character recognition for said created recognition image; and outputting the recognition result having a greatest reliability by making the character recognition for all the combinations while changing said combination of line segments successively, wherein the division into said line segments comprises:
thinning all the line segments in the image within said recognition area;
extracting an endpoint and an intersection from said line segments;
dividing said thinned image into line segments from said endpoint to said intersection, said endpoint to said endpoint, or said intersection to said intersection, wherein each of said line segments is extended to the original line width by referring to said input original image.

2. The character recognition method according to claim 1, wherein when said character recognition result is a character registered as having a high possibility of false recognition so that the character recognition results is determined to be any other character pattern, said character recognition result is exchanged by one of said other characters determined by the false recognition, if there is any recognition candidate obtained for said other character in a process of performing the character recognition while changing said combination of line segments.

3. The character recognition method according to claim 2, wherein said character recognition result is exchanged only if the reliability of character recognition for said other character is greater than or equal to a preset fixed value.

4. The character recognition method according to claim 2, wherein said character recognition result is exchanged only if any line segments of said character recognition result are included in the line segments constituting a character recognition candidate of said other character.

5. The character recognition method according to claim 2, wherein said character recognition result is exchanged only if the reliability of character recognition for said other character is greater than or equal to a preset fixed value, and any line segments of said character recognition result are included in the line segments constituting a character recognition candidate of said other character.

6. The character recognition method according to claim 1, wherein in the case where a region for entering the character to be recognized in the image within the recognition area is predetermined, the line segments within the region for entering the character are necessarily included, when the combination of plural line segments divided is changed.

7. The character recognition method according to claim 1, wherein only if the size of a graphic created by the combination of plural divided line segments is within a predetermined range, the character recognition is performed, while if it is outside the predetermined range, the character recognition is omitted.

8. A character recognition method for recognizing characters entered in a document or the like including preprint information, comprising:
dividing an image in an area where the characters to be recognized are present into line segments individually,
wherein the image is obtained by reading said preprint information and the entry characters;

creating a recognition image by changing a combination of a plurality of line segments divided;

memorizing a recognition result with reliability by making the character recognition for said created recognition image; and outputting the recognition result having a greatest reliability by making the character recognition for all the combinations while changing said combination of line segments successively, wherein when the combination of said plurality of divided line segments is changed, it is checked whether or not there is connectivity in said combination, in which if there is no connectivity, no recognition is made for said combination, and only if there is connectivity, a recognition image for said combination is created to make the character recognition.

9. The character recognition method according to claim 8, wherein when said character recognition result is a character registered as having a high possibility of false recognition so that the character recognition results is determined to be any other character pattern, said character recognition result is exchanged by one of said other characters determined by the false recognition, if there is any recognition candidate obtained for said other character in a process of performing the character recognition while changing said combination of line segments.

10. The character recognition method according to claim 9, wherein said character recognition result is exchanged only if the reliability of character recognition for said other character is greater than or equal to a preset fixed value.

11. The character recognition method according to claim 9, wherein said character recognition result is exchanged only if any line segments of said character recognition result are include in the line segments constituting a character recognition candidate of said other character.

12. The character recognition method according to claim 9, wherein said character recognition result is exchanged only if the reliability of character recognition for said other character is greater than or equal to a preset fixed value, and any line segments of said character recognition result are included in the line segments constituting a character recognition candidate of said other character.

13. The character recognition method according to claim 8, wherein in the case where a region for entering the character to be recognized in the image within the recognition area is predetermined, the line segments within the region for entering the character are necessarily included, when the combination of plural line segments divided is changed.

14. The character recognition method according to claim 8, wherein only if the size of a graphic created by the combination of plural divided line segments is within a predetermined range, the character recognition is performed, while if it is outside the predetermined range, the character recognition is omitted.

15. A computer-readable storage recording medium storing a computer-readable program which controls a computer system to execute character recognition by:
dividing an image in an area where characters to be recognized are present into line segments individually, wherein the image is obtained by reading the characters entered in the document or the like including preprint information;
creating a recognition image by changing a combination of said plurality of line segments divided;

memorizing a recognition result with reliability by making the character recognition for said created recognition image; and outputting the recognition result having a greatest reliability by making the character recognition for all the combinations while changing said combination of line segments successively, wherein when said output character recognition result is a character registered as having a high possibility of false recognition so that the character recognition results is determined to be any other character pattern, said character recognition result is exchanged by one of said other characters determined by the false recognition, if there is a recognition candidate obtained for said other character in a process of performing the character recognition.

16. A computer-readable storage recording medium storing a computer-readable program which controls a computer system to execute character recognition by dividing an image in an area where the characters to be recognized are present into line segments individually, wherein the image is obtained by reading said preprint information and the entry characters;

creating a recognition image by changing a combination of a plurality of line segments divided;

memorizing a recognition result with reliability by making the character recognition for said created recognition image; and outputting the recognition result having a greatest reliability by making the character recognition for all the combinations while changing said combination of line segments successively, wherein the division into said line segments comprises:
thinning all the line segments in the image within said recognition area;

extracting an endpoint and an intersection from said line segments;

dividing said thinned image into line segments from said endpoint to said intersection, said endpoint to said endpoint, or said intersection to said intersection, wherein each of said line segments is extended to the original line width by referring to said input original image.

* * * * *

UNITED STATES PATENT AND TRADEMARK OFFICE
CERTIFICATE OF CORRECTION

PATENT NO. : 6,947,596 B2  Page 1 of 1
APPLICATION NO. : 09/925319
DATED : September 20, 2005
INVENTOR(S) : Junji Kashioka et al.

It is certified that error appears in the above-identified patent and that said Letters Patent is hereby corrected as shown below:

Column 18, Line 36, delete "include" and insert -- included -- therefor.

Signed and Sealed this

First Day of August, 2006

JON W. DUDAS
*Director of the United States Patent and Trademark Office*